United States Patent
Christensen

(10) Patent No.: US 6,582,105 B1
(45) Date of Patent: Jun. 24, 2003

(54) EXTENDABLE MAST ARRANGEMENT HAVING A CODED REMOTE CONTROL SYSTEM

(75) Inventor: Jerry A. Christensen, Wooster, OH (US)

(73) Assignee: The Will-Burt Company, Orrville, OH (US)

( * ) Notice: Subject to any disclaimer, the term of this patent is extended or adjusted under 35 U.S.C. 154(b) by 0 days.

(21) Appl. No.: 09/920,598

(22) Filed: Aug. 2, 2001

(51) Int. Cl.$^7$ .............................................. F21V 21/22
(52) U.S. Cl. ................. 362/385; 362/526; 340/825.69; 375/133; 375/132; 379/102.02
(58) Field of Search ................. 362/385, 526; 379/102.02; 455/152.1; 375/130, 132, 133; 340/825.69

(56) References Cited

U.S. PATENT DOCUMENTS

| | | | | |
|---|---|---|---|---|
| 3,859,462 A | * | 1/1975 | Saxon .................... | 340/825.61 |
| 4,479,226 A | * | 10/1984 | Prabhu et al. .............. | 375/134 |
| 4,554,668 A | * | 11/1985 | Deman et al. .............. | 375/133 |
| 4,864,588 A | * | 9/1989 | Simpson et al. ............ | 375/365 |
| 4,995,053 A | * | 2/1991 | Simpson et al. ............ | 375/130 |
| 5,179,569 A | * | 1/1993 | Sawyer ....................... | 340/600 |
| 5,220,580 A | * | 6/1993 | Heberle et al. ............. | 375/142 |
| 5,236,199 A | * | 8/1993 | Thompson, Jr. .......... | 348/14.05 |
| 5,408,496 A | * | 4/1995 | Ritz et al. ................... | 375/132 |
| 5,572,837 A | * | 11/1996 | Featherstone et al. ...... | 362/385 |
| 5,712,626 A | * | 1/1998 | Andreou et al. ............ | 375/133 |
| 5,743,635 A | * | 4/1998 | Hulse et al. ................ | 362/294 |
| 5,748,669 A | * | 5/1998 | Yada .......................... | 375/135 |
| 5,963,624 A | * | 10/1999 | Pope ....................... | 379/110.01 |
| 5,980,070 A | * | 11/1999 | Hulse et al. ................ | 362/294 |
| 6,115,456 A | * | 9/2000 | Nolde .................... | 379/102.01 |
| 6,160,491 A | * | 12/2000 | Kitao et al. ............ | 340/825.69 |
| 6,290,377 B1 | * | 9/2001 | Hulse .......................... | 362/385 |
| 6,299,336 B1 | * | 10/2001 | Hulse .......................... | 362/198 |

OTHER PUBLICATIONS

Pending U.S. patent application No. 09/383,428 (our docket WB-2050).
Pending U.S. patent application No. 09/384,071 (our docket WB-12404).
Pending U.S. patent application No. 09/384,076 (our docket WB-12403).
"Spread Spectrum (SS) Introduction", technical article by ir. J. Meel of DeNayer Polytechnic School for Engineers, Belgium, dated Oct. 6, 1999.

* cited by examiner

Primary Examiner—Sandra O'Shea
Assistant Examiner—Ismael Negron
(74) Attorney, Agent, or Firm—Fay, Sharpe, Fagan, Minnich & McKee

(57) ABSTRACT

An extendable mast arrangement, that is supported on a mobile vehicle, having a telescopically extending mast and a mast accessory supported at one end thereof. The mast arrangement having a control system for effecting the movements and functions of the mast and mast accessories, that includes a wireless remote control that utilizes coded command signals to communicate instructions to the control system of the mast arrangement. The control system, including the remote control, utilizes spread spectrum modulation to encode and decode the electromagnetically transmitted control commands. Particularly, the control system uses frequency hopping modulation, a form of spread spectrum modulation, to encode and decode the command signals.

104 Claims, 15 Drawing Sheets

EXTENDABLE MAST ARRANGEMENT HAVING A CODED REMOTE CONTROL SYSTEM

The subject invention relates to the art of extendable mast arrangements, and more particularly to extendable mast arrangements that include a wireless remote control that utilizes coded electromagnetic signals to interface with the mast arrangement and thereby control the movements and functions thereof.

INCORPORATION BY REFERENCE

Featherstone, U.S. Pat. No. 5,572,837; Hulse, U.S. Pat. No. 5,743,635; Yada, U.S. Pat. No. 5,748,669; Hulse, U.S. Pat. No. 5,980,070; Hulse, co-pending U.S. patent application Ser. No. 09/383,428; Hulse, co-pending U.S. patent application Ser. No. 09/384,071; Sturm, co-pending U.S. patent application Ser. No. 09/384,076; and, Spread Spectrum Introduction, Technical Paper by ir. J. Meel of DeNayer Polytechnic School for Engineers, Belgium, Oct. 6, 1999 are incorporated herein by reference as background art.

BACKGROUND OF THE INVENTION

Extendable mast arrangements have been provided heretofore, and generally, as shown in Featherstone '837, Hulse '635 and Hulse '070 for example, have an extendable mast articulable about a base that is supported on a mobile vehicle. At the end of the mast opposite the base is at least one accessory, such as a light source. The accessory may also be adjustable in some manner. For example, the light source may have high output and low output settings. Furthermore, the light source may be rotatable about the mast and/or pivotable about an axis perpendicular to the mast. As a result, the mast arrangement will have a wide variety of movements and functions that should be responsive to the commands of an operator to maximize the utility of the mast arrangement.

Previously, extendable mast arrangements of the foregoing character have provided an operator interface for the input of movement and function commands. Often the interface is in the form of a control panel or control pad located within the vehicle or attachable to the base of the mast adjacent the outside of the vehicle. This type of interface communicated electrical command signals directly to the control system of the mast arrangement. These electrical command signals are utilized by the mast arrangement to cause the extension or retraction of the mast, to cause the mast to pivot about the base, to cause the light source to turn on and off, and/or to cause the light source to pan about the mast or tilt about the axis perpendicular to the mast.

One problem with the above-described arrangement is that the control system of the mast arrangement must directly communicate electrical command signals to the mast accessory at the elevated end of the mast. As such, a separate wire for each function or movement of the accessory must extend from the base to the accessory at the elevated end of the mast. For an accessory having multiple functions and a variety of movements, a substantial number of wires may be required to transmit all of the command signals from the base to the accessory. This can add a significant amount of weight to the mast. Even though this additional weight is distributed along the entire length of the mast, the contribution of the portion of the wires extending along the accessory end of the mast places a significant additional load on the entire mast arrangement. Accordingly, it would be beneficial to minimize the wires extending from the base to the mast accessory.

Another problem with the previously discussed arrangement is that the control panel in the vehicle and the control pad attached to the outside of the vehicle each limit the mobility of the operator when deploying or adjusting the position of the mast and accessory. When utilizing the control panel, the operator must be in or at least reach into a compartment of the vehicle. This often makes it difficult to see the orientation of the mast and accessory, complicating deployment and directional adjustment. Utilizing the control pad attached to the base outside the vehicle improves the operator's ability to view the deployment of the mast and the directional positioning of the accessory supported thereon. However, the operator's range of mobility is limited by the length of the cord extending between the control pad and the base. Furthermore, the cord cannot be too long because it can become easily damaged and also presents a safety hazard should it be extended across an emergency or construction site where the mast arrangement is deployed. As such, the operator must remain near the vehicle when deploying the mast and return to the vehicle to adjust the mast or accessory as conditions or needs at the deployment site change. Accordingly, it would be beneficial to allow the operator to deploy and manipulate the mast and accessory while at a distance from the vehicle without requiring an extended cord stretching back to the vehicle.

Sturm, Application No. '076, makes progress toward overcoming the disadvantages discussed above. Sturm discloses an extendable mast arrangement with a control system that utilizes a wireless remote control for the input of command signals by an operator. The remote control transmits the command signals to the mast arrangement using a suitable electromagnetic wave. One disadvantage of the invention disclosed in Sturm is that the communication signals between the remote control and the mast arrangement are susceptible to interference, at times rendering a mast arrangement unresponsive to the command signals from the remote control. Another disadvantage of devices such as that disclosed in Sturm is realized in situations where multiple mast arrangements are deployed in one area. It will be appreciated that in such a situation many or all of the mast arrangements may respond to a command signal from a remote control that was intended to adjust only one mast arrangement. As such, it would be beneficial to utilize communication signals that are less influenced by interference and that reduce unintentional response of neighboring mast arrangements.

SUMMARY OF THE INVENTION

In accordance with the present invention, an extendable mast arrangement is provided which overcomes or minimizes the problems and difficulties encountered with the use of arrangements of the foregoing nature, while promoting and maintaining the desired simplicity of structure, economy of manufacture, and ease of operation. More particularly in this respect, an extendable mast arrangement according to the invention includes a base supported on a mobile vehicle, a telescopically extending mast pivotally supported at one end by the base, a mast accessory supported at the opposite end of the mast, and a control system for controlling the movements and functions of the mast and mast accessory. The control system includes controllers for controlling the movements and functions of the mast accessory, and a remote control for the input of control commands by an operator. The control system further includes at least one encoder for encoding the control commands, at least one transmitter for transmitting the encoded control commands as command signals, at least one receiver for receiving the encoded command signals, and at least one decoder for decoding the command signals from the receiver. One of the encoders and one of the transmitters is in the wireless remote control, and one of the receivers and one of the decoders is supported on the mast adjacent the mast accessory. Preferably, the base will include a second receiver and a second decoder. Additionally, the base may include a second encoder and a second transmitter. As such, coded command signals may be transmitted to the mast arrangement by the wireless remote control from a distant location without the need for extension cords to carry the command signals. Furthermore, as will be discussed in detail hereinafter, the encoders and decoders respectively use spread spectrum modulators and demodulators to cooperatively encode and decode the control commands reducing the likelihood that more than one mast arrangement will be responsive to the encoded command signals and producing a command signal that is minimally affected by interference.

In use, the operator enters control commands into the wireless remote control, such as by depressing command keys on a keypad, to deploy, adjust or stow the mast and mast accessory. The wireless remote control broadcasts the encoded command signals which are picked up by one or more receivers on the mast arrangement. The mast and mast accessories respond to the received command signals until the operator determines that the mast and mast accessory are properly positioned and discontinues the transmission of command signals from the remote control. As a result, the mast and mast accessory can be deployed, adjusted and stowed from a distance by utilizing the wireless remote control. Furthermore, the mast arrangement can utilize a mast accessory at the end of the mast which has multiple functions and movements while minimizing the number of wires that must extend to the accessory from the base.

The spread spectrum modulators and demodulators respectively utilize frequency hopping modulation and demodulation to encode and decode the command signals. Frequency hopping modulation both encodes the command signal and reduces the signal's susceptibility to interference. Furthermore, each mast arrangement encoding and decoding command signals can utilize a unique code sequence. As such, multiple mast arrangements can be deployed in one area without having cross-communication between wireless remote controls.

Accordingly, it is an outstanding object of the present invention to provide an extendable mast arrangement of the foregoing character having a wireless, remote control interface for directing command signals to the extendable mast arrangement that reduces or minimizes the need for electrical communication wires extending between the base of the mast arrangement and the mast accessory supported on the end of the extendable mast.

Another object is the provision of an extendable mast arrangement of the foregoing character in which the mast and mast accessory thereon can be deployed, adjusted and/or stowed using a remote control interface operable at a distance from the mast arrangement, without the need for extension cables stretched between the interface and the mast arrangement.

Still another object is the provision of an extendable mast arrangement of the foregoing character that utilizes wireless communication to direct command signals from a remote control interface to the mast arrangement, where the wireless communication is encoded to eliminate cross-communication between multiple mast arrangements deployed in one area.

Yet another object is the provision of an extendable mast arrangement of the foregoing character that utilizes wireless communication to direct command signals from a remote control interface to the mast arrangement, where the wireless communication employs spread spectrum modulation to produce wide band, lower power density signals rather than narrow band, higher power density signals, and thereby minimize the interference from other electromagnetic signals.

A further object is the provision of an extendable mast arrangement of the foregoing character which is comprised of a minimal number of components and is structurally and electrically simple, thereby promoting the economic production of the extendable mast arrangement.

BRIEF DESCRIPTION OF THE DRAWINGS

The foregoing objects, and others, will in part be obvious and in part pointed out more fully hereinafter in conjunction with a written description of preferred embodiments of the invention illustrated in the accompanying drawings, in which.

DESCRIPTION OF PREFERRED EMBODIMENTS

Figure 1:
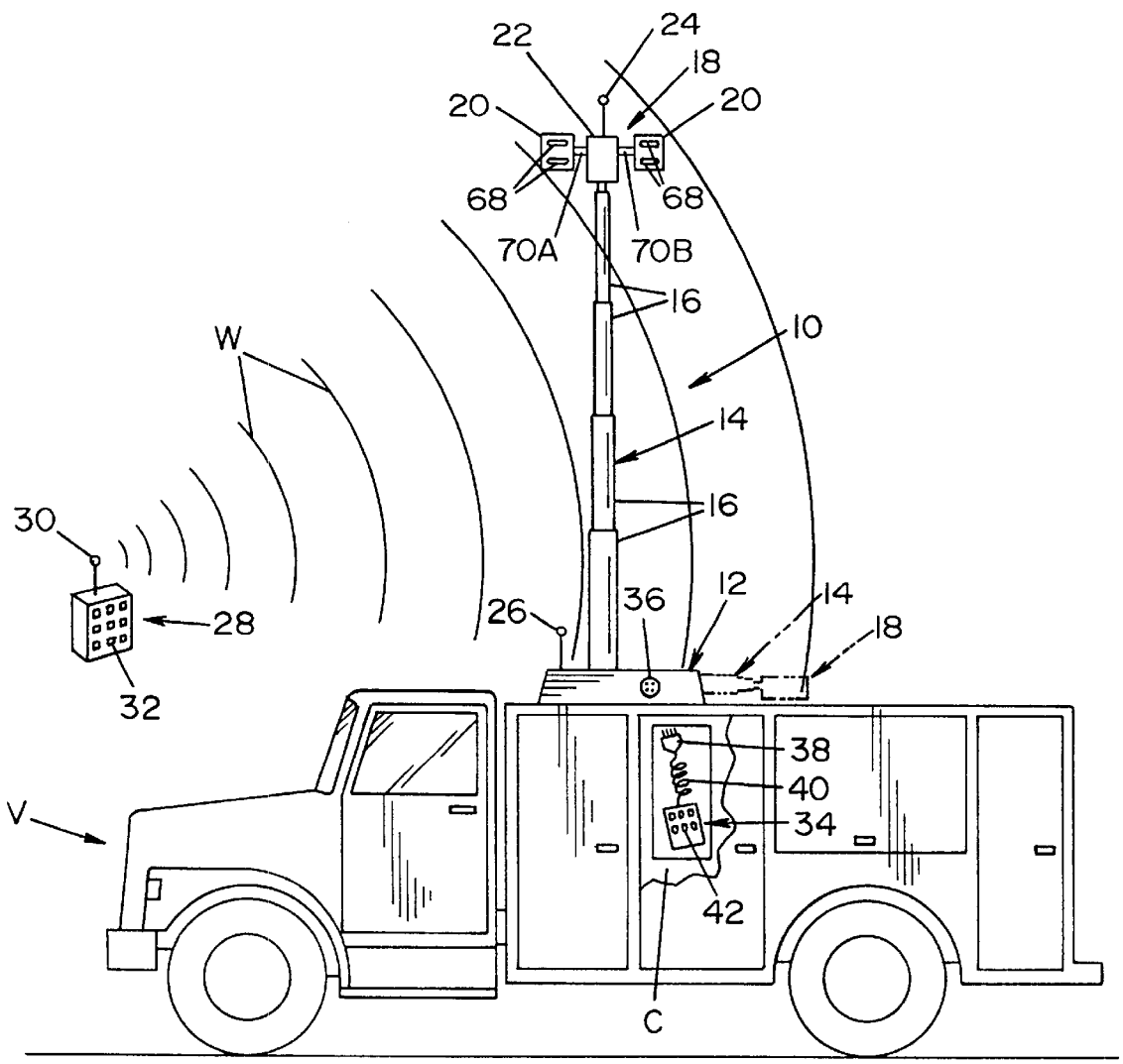
FIG. 1 is an illustration of one embodiment of an extendable mast arrangement in accordance with the present invention, including a wireless remote control interface transmitting command signals to the base and mast accessory of the mast arrangement.
Figure 2:
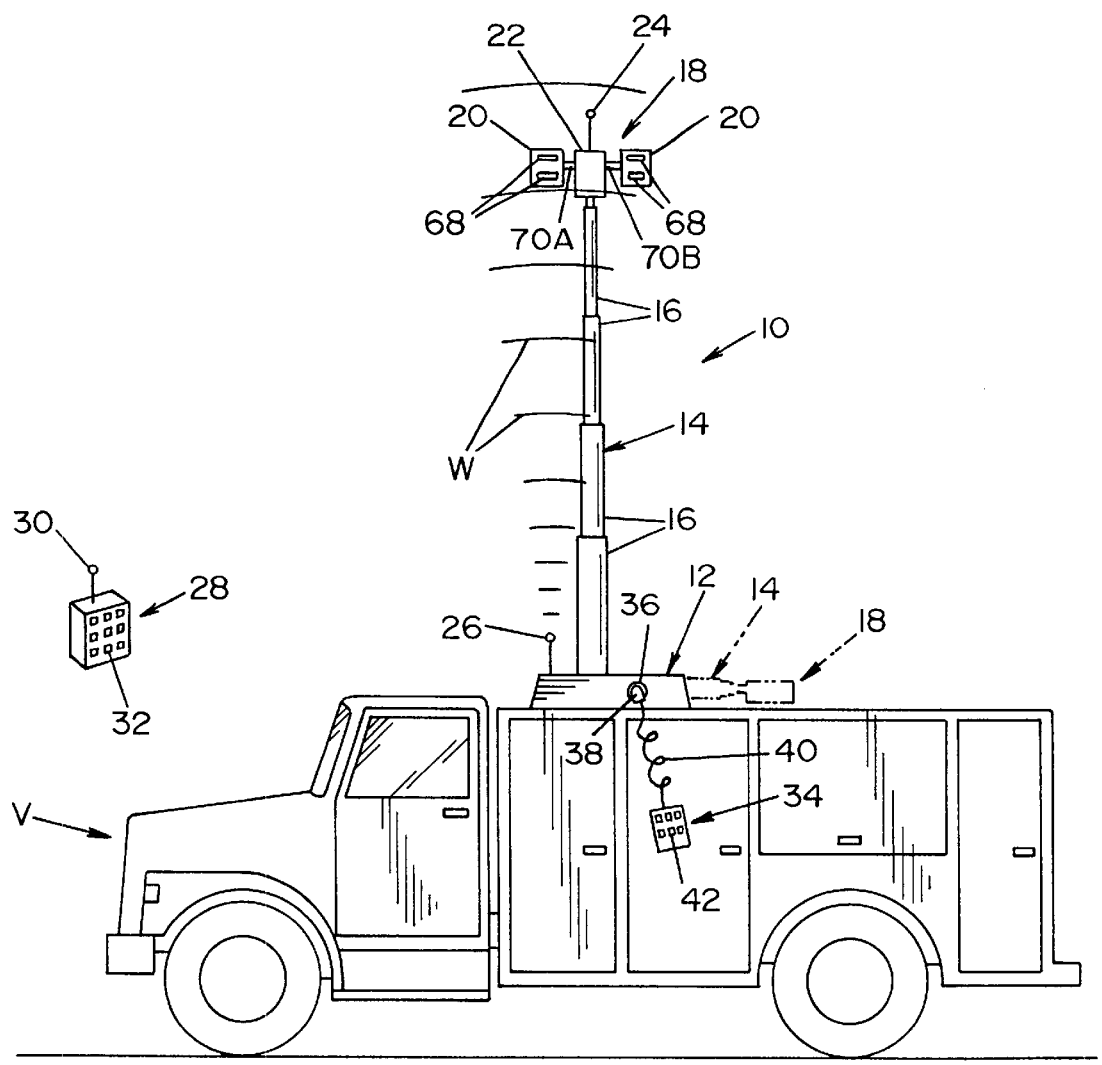
FIG. 2 is an illustration of the extendable mast arrangement of FIG. 1, showing the base transmitting command signals to the mast accessory and where the command signals are communicated to the base by a wired control pad.

Referring now in greater detail to the drawings, wherein the showings are for the purpose of illustrating preferred embodiments of the invention only, and not for the purpose of limiting the invention, FIGS. 1 and 2 of the drawings illustrate a mobile vehicle V supporting an extendable mast arrangement 10. A base 12 of arrangement 10 pivotally supports a telescopically extendable mast 14 which is comprised of a plurality of mast sections 16. Mast 14 is pivotally supported on base 12 in a manner such as is disclosed in the patents to Featherstone '837, Hulse '635, Hulse '070, and the pending applications to Hulse '428 and '071. All of which have been incorporated herein by reference. Mast 14 supports a mast accessory, such as light 18, at the end opposite base 12. Light 18 includes light housings 20 and controller housing 22. It will be appreciated that mast 14 may support one or more of a wide variety of accessories, such as cameras, microphones, and loudspeakers, for example. The subject embodiment utilizes light 18 as one illustration of a mast accessory, and is in no way intended as a limitation with regard to type of accessories supportable on mast 14.

Mast arrangement 10 includes a control system that will be discussed in detail hereinafter. The components of the control system that are visible in FIGS. 1 and 2, include accessory antenna 24 extending from controller housing 22, base antenna 26 extending from base 12, remote antenna 30 extending from wireless remote control 28, and receptacle 36 supported on base 12. It will be appreciated, and more fully discussed hereinafter, that the control system of mast arrangement 10 is comprised of various subsystems located in different parts of the mast arrangement, including a mast control subsystem adjacent base 12 and a light control subsystem adjacent controller housing 22. Base antenna 26 and receptacle 36 are in electrical communication with the mast control subsystem on base 12, and accessory antenna 24 is in electrical communication with a light control subsystem on controller housing 22.

FIGS. 1 and 2 illustrate the utilization of two different interfaces for the input of control commands by an operator. In FIG. 1, an operator manipulates a plurality of control keys 32 of wireless remote control 28 to input control commands corresponding to the desired movement of mast 14 and/or light 18. Remote control 28 converts the control commands to encoded command signals which are transmitted through remote antenna 30 as electromagnetic waves W. Antennas 24 and 26 receive waves W, which are then decoded from command signals into control commands to which the mast control subsystem and accessory control subsystem are responsive. It will be appreciated that electromagnetic waves W output by remote control 28 will include control commands for both the functions and movements of light 18 as well as those of mast 14. As such, both the light control portion of the control system and the mast control portion of the control system will, at times, receive command signals that are directed toward a different portion of mast arrangement 10. That is, the light control portion of the control system will receive and decode command signals directed toward the mast control portion of the control system and vice versa. Such command signals may be filtered out by the microprocessor of that portion of the control system.

In FIG. 2, an operator manipulates control keys 42 of wire control pad 34 to input control commands corresponding to the desired movement or function of mast 14 and/or light 18. Control pad 34, through cord 40, plug 38, and receptacle 36, is in electrical communication with the mast control subsystem in base 12. As such, control commands are communicated from pad 34 through cord 40 and plug 38, which is interengaged with receptacle 36, into the mast control subsystem. Not all of the control commands communicated to the mast control subsystem from the wired control pad are directed to controlling the mast. Some control commands will be instructions for the accessory control subsystem. Accordingly, the mast control subsystem is also adapted to convert the control commands received from control pad 34 into encoded command signals which are transmitted through base antenna 26 as electromagnetic waves W. Accessory antenna 24 receives waves W, which are then decoded as previously discussed with respect to FIG. 1, and an accessory control subsystem responds accordingly by adjusting light 18. In this way, the accessory control subsystem can receive any and all control commands without the need for an electrical communication cable extending along mast 14 from base 12 to controller housing 22.

Figure 4:
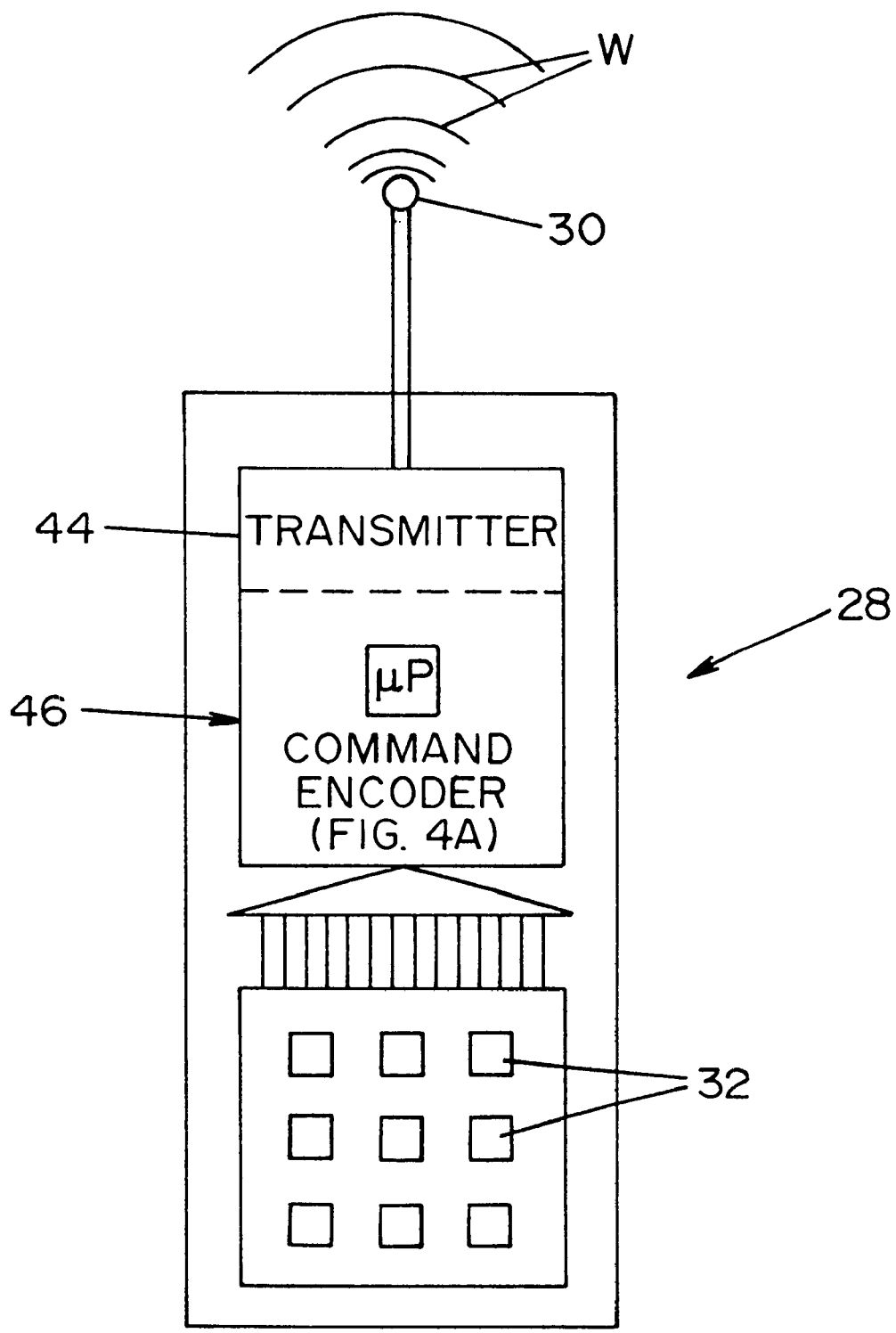
FIG. 4 is a schematic diagram of the wireless remote control interface of FIGS. 1 and 2.
Figure 4A:
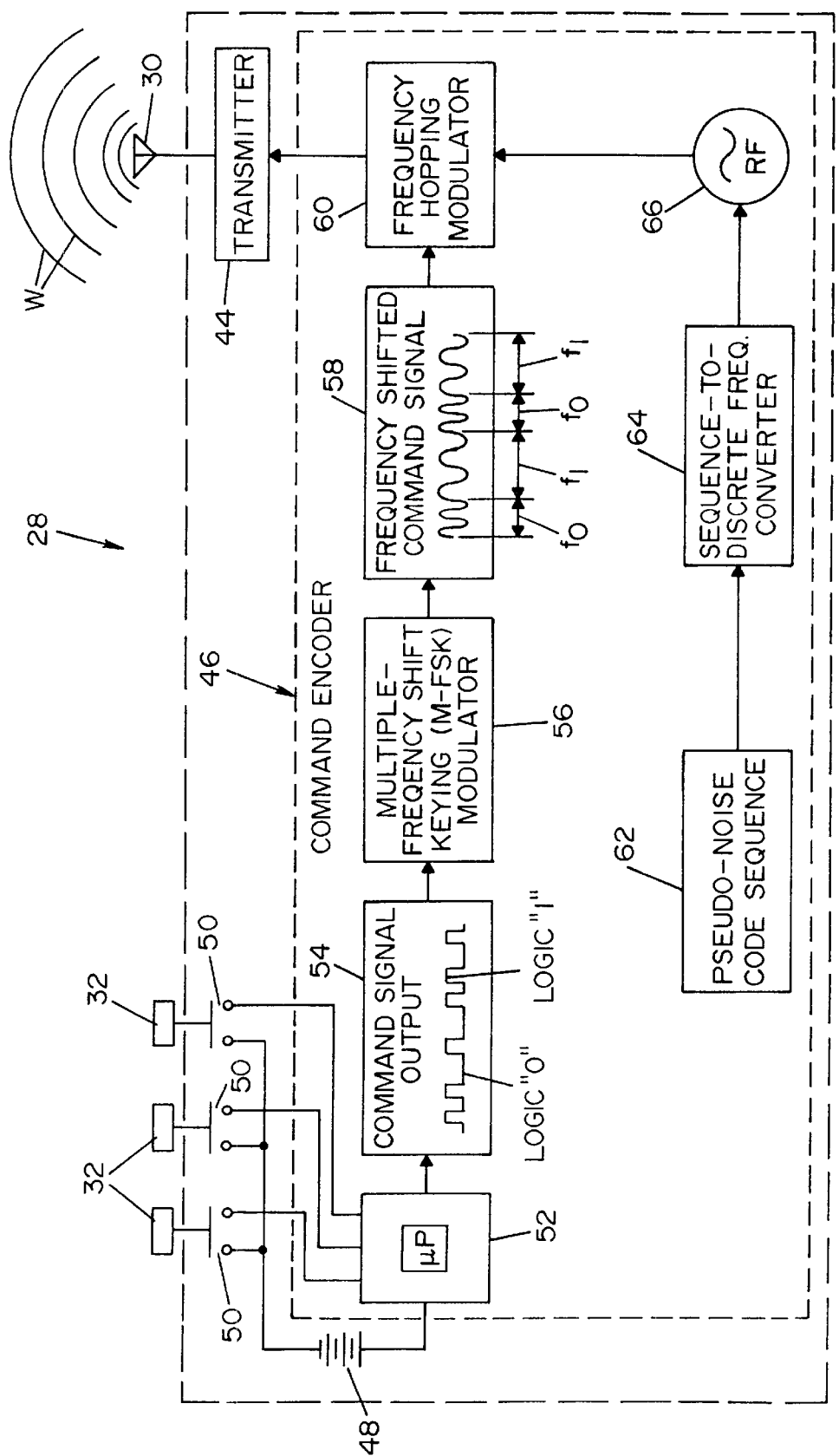
FIG. 4A is a schematic diagram of the command encoder shown in FIG. 4.

Remote control 28, as is further shown in FIGS. 4 and 4A, includes the plurality of control keys 32, a command encoder 46, a transmitter 44, remote antenna 30, and a self-contained power source, such as a battery 48. It will be appreciated that control keys 32 may be replaced with any suitable input device, such as a membrane pad or a touch-screen. Each one of the plurality of control keys 32 form a circuit between battery 48 and microprocessor 52 of command encoder 46. As one of the control keys is depressed, a corresponding control switch 50 is closed sending an electrical signal from battery 48 to microprocessor 52 corresponding to the desired function of the depressed control key. As will be further described hereinafter, command encoder 46, including microprocessor 52, outputs an encoded command signal that corresponds to the operator's input to transmitter 44 which broadcasts the encoded command signal as electromagnetic waves W via remote antenna 30.

Figure 6:
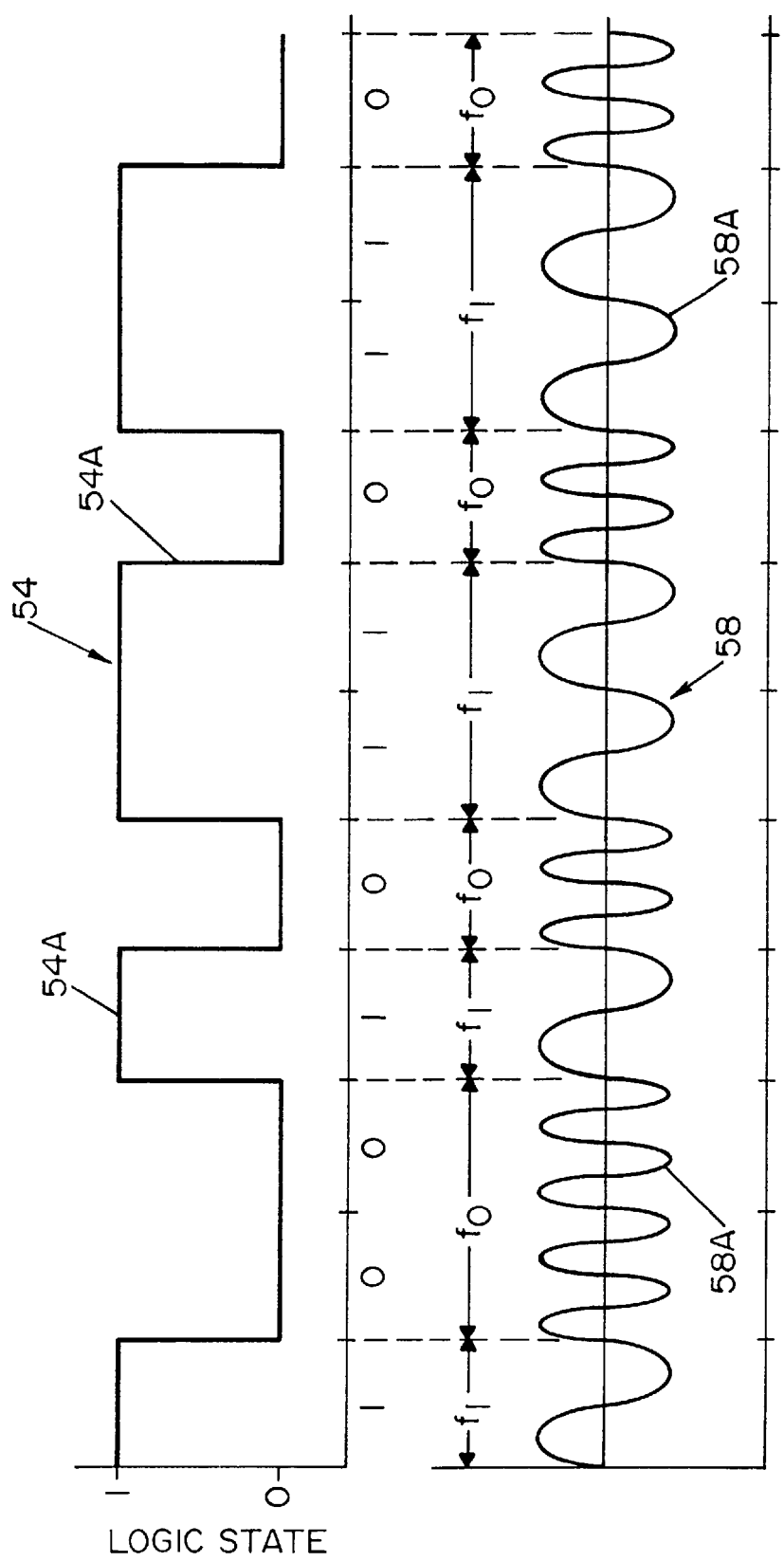
FIG. 6 is a graph of a binary command signal converted to a frequency-shift keying modulated command signal.

Turning now to the encoding and transmitting portion of the remote control, frequency hopping modulation is a form of spread spectrum modulation used to convert a narrow bandwidth signal susceptible to interference and interception into a wide bandwidth encoded signal that is difficult to intercept and which is minimally affected by interference. Spread spectrum modulation, including frequency hopping and other modulation techniques, is a common and well understood technology as discussed in the technical paper Spread Spectrum Introduction by Meel, which as been incorporated herein be reference. As is illustrated in FIG. 4A, command encoder 46 is comprised of microprocessor 52, a multiple-frequency shift keying modulator 54, a frequency hopping modulator 60, a pseudo-noise code sequence 62, a discrete frequency converter 64, and a carrier wave generator 66. Microprocessor 52 outputs a binary command signal 54 consisting of high and low logic states, respectively shown as logic state "1" and logic state "0" on line 54A of FIG. 6. Binary command signal 54 is fed into M-FSK modulator 56 which converts the digital, binary command signal into a frequency-shifted, analog command signal 58. Frequency-shifted command signal 58 is a generally contiguous, sinusoidal waveform comprised of a series of single waves each of which has one of two specified frequencies, with one frequency corresponding to each one of the two logic states. Line 58A of FIG. 6 illustrates frequency-shift command signal 58 that corresponds to binary command signal 54 illustrated by line 54A. Frequency $f_0$ corresponds to logic state "0" and frequency $f_1$ corresponds to logic state "1". In FIG. 6, frequency $f_0$ is shown to be twice the frequency of frequency $f_1$. It should be appreciated, however, that frequencies $f_0$ and $f_1$, may be any two of a virtually infinite number of frequencies suitable for use in modulating the binary command signal.

Figure 7:
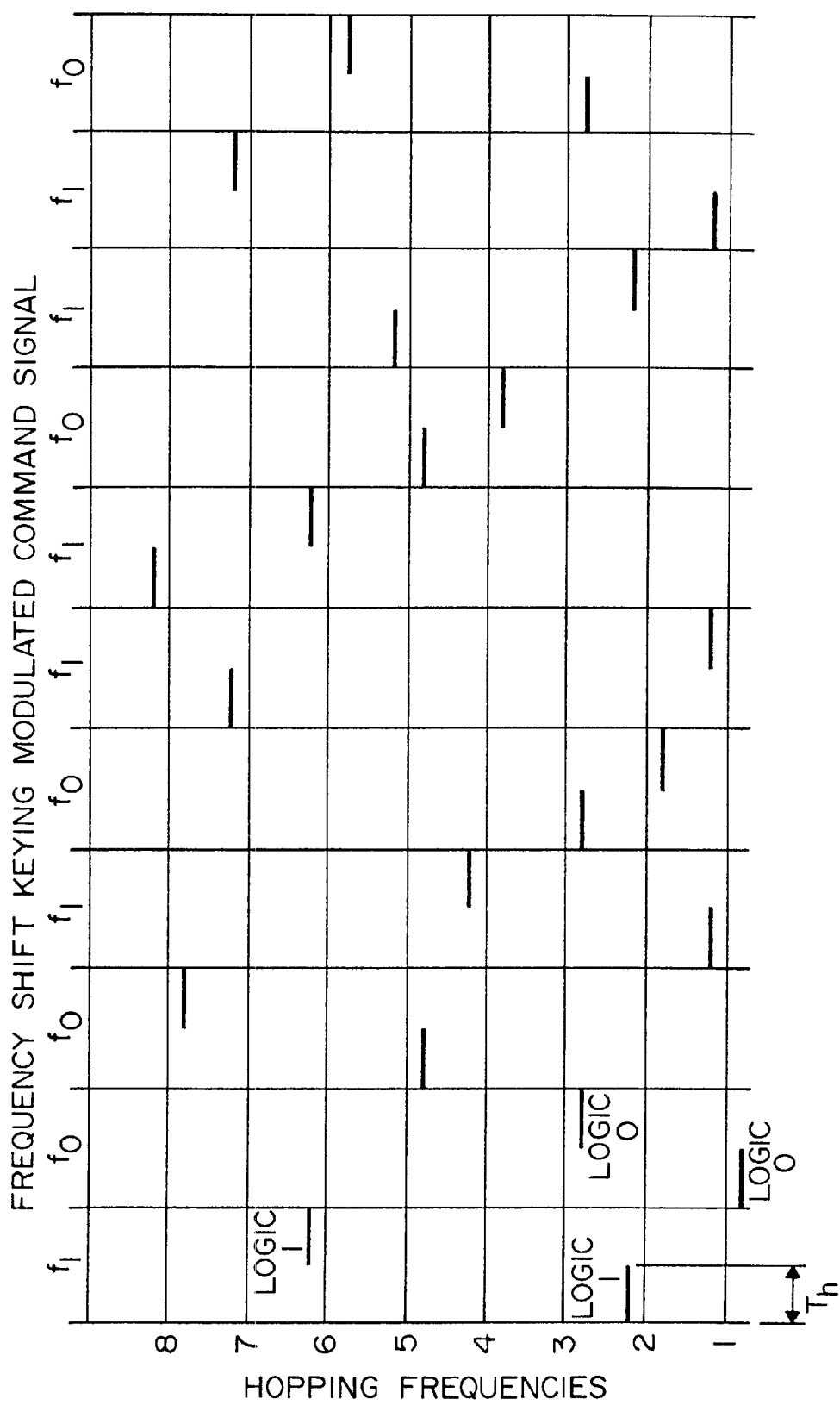
FIG. 7 is a graph of a frequency hopping sequence for converting a frequency-shift keying modulated command signal to a frequency-hopped spread spectrum command signal.

Returning to FIG. 4A, frequency hopping modulator 60 is shown as having two inputs and an output. Frequency-shifted command signal 58 is one input. A carrier wave that "hops" between a number of discrete frequencies in a pseudo-random pattern is the other input. The carrier wave and frequency-shifted command signal are combined by modulator 60 to form an encoded command signal which is output to transmitter 44 and broadcast via remote antenna 30 as electromagnetic waves W. The carrier wave is generated by wave generator 66 in response to a series of frequency signals input by frequency converter 64. A pseudo-noise code sequence 62 is fed into converter 64, and each element of the sequence is converted to or correlated with a discrete hopping frequency within the frequency band utilized by converter 64. After a specified time, shown as $T_h$ in FIG. 7, converter 64 will use the next element in sequence 62 to determine the next hopping frequency. This process continues until the end of pseudo-noise code sequence 62, at which time the sequence starts again from the beginning. As previously mentioned, converter 64 outputs a series of frequency signals that appear to hop in a random fashion between any number of discrete frequencies within the band of frequencies utilized by command encoder 46. A portion of such a series of frequency signals is shown in FIG. 7 as horizontal lines of length $T_h$ that hop from frequency 2 to frequency 6 to frequency 1 to frequency 3 to frequency 5, etc. Eight hopping frequencies are shown along the vertical axis of FIG. 7, and frequency-shifted command signal 58 is shown along the top of FIG. 7. Convert 64 feeds the series of frequency signals into wave generator 66 which, in response, generates a generally contiguous carrier wave that hops from frequency-to-frequency in accordance with the frequency signals. The carrier wave is then input into modulator 60 and combined with frequency-shifted command signal 58 to form the encoded command signal as previously discussed. It will be appreciated that sequence 62 and converter 64 may respectively have many thousands of code elements and frequencies. It will be further appreciated that spread spectrum modulation is well known and that the embodiment disclosed hereinbefore represents only one possible configuration of a device of the foregoing character.

Figure 5:
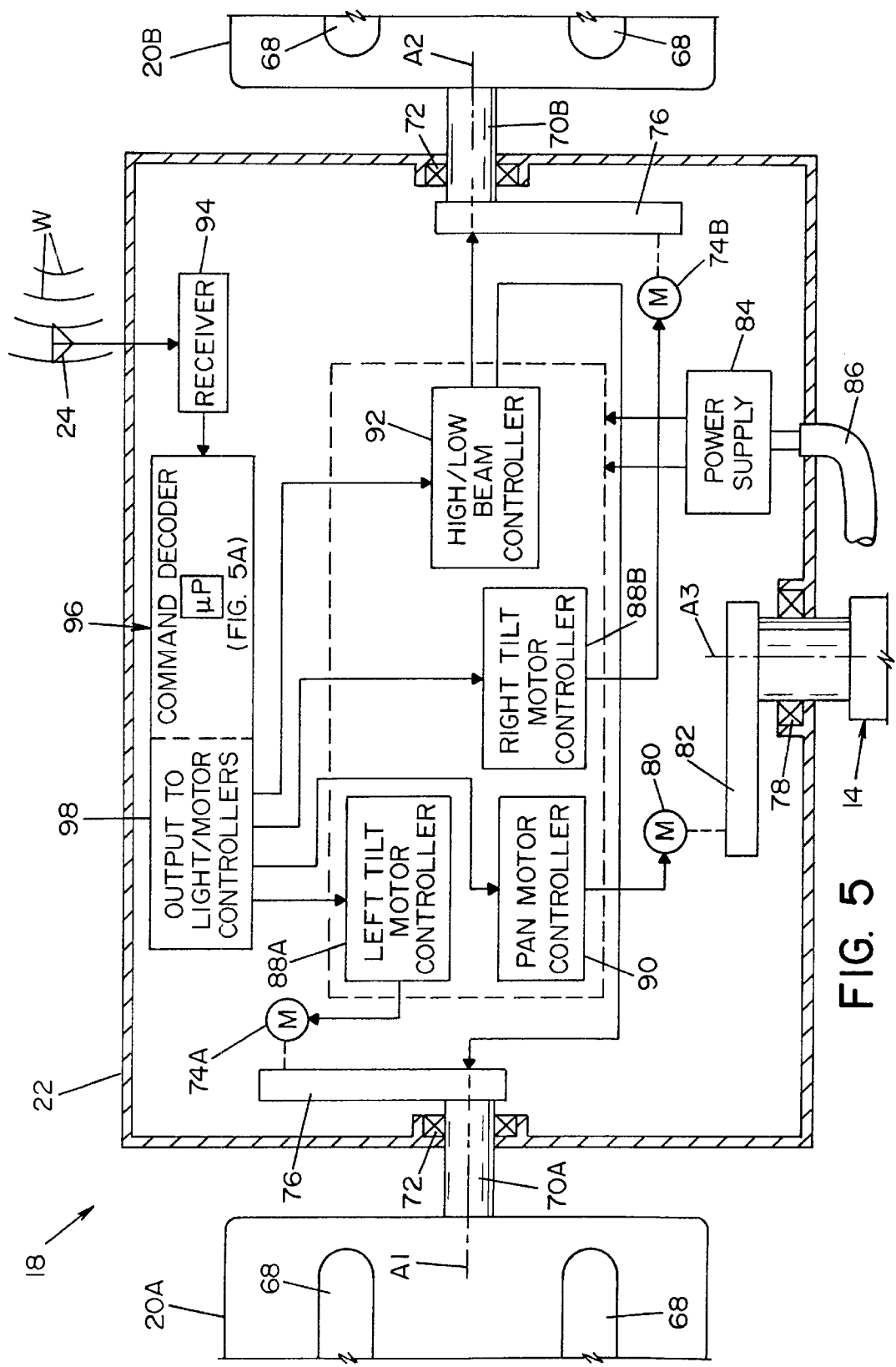
FIG. 5 is a schematic diagram of the portion of the control system adjacent the mast accessory of the extendable mast arrangement of FIGS. 1 and 2.

Light 18 is shown is shown in FIG. 5 as having a controller housing 22 supported on the end of mast 14. Controller housing 22 supports a left light housing 20A and a right light housing 20B each of which has two light sources 68. Light housings 20A and 20B are respectively supported on shafts 70A and 70B which are supported by bearings 72 of controller housing 22. Shaft 70A supports left light housing 20A and defines an axis A1. Shaft 70A is driveably connected to left tilt motor 74A by belt 76, such that shaft 70A and housing 20A are rotatable around axis A1. Similarly, shaft 70B supports light housing 20B and defines an axis A2. Shaft 70B is driveably connected to right tilt motor 74B by belt 76 such that shaft 70B and housing 20B are rotatable around axis A2. Controller housing 22 is supported at the end of mast 14 by bearing 78.

Mast 14 defines an axis A3 about which light 18 rotates on bearing 78. Mast 14 is stationery, a pan motor 80 generates rotational output which is transmitted to mast 14 through belt 82. In response to the output of motor 80, light 18 pans about axis A3 of the stationary mast 14. Controller housing 22 supports a power supply 84 which receives electricity through wire 86 from a power source at the opposite end of mast 14 adjacent the vehicle. Controller housing 22 also supports a left tilt motor controller 88A and a right tilt motor controller 88B. Controllers 88A and 88B respectively communicate with tilt motors 74A and 74B to independently direct light housings 20A and 20B. Light sources 68 which are supported by light housings 20A and 20B are illuminated and extinguished in response to signals from beam controller 92. Pan motor controller 90 communicates with pan motor 80 to rotate light 18 about axis A3 of mast 14 as previously discussed.

Controller housing 22 also supports accessory antenna 24, receiver 94, command decoder 96, and command output 98. Receiver 94 receives control commands from remote control 28, in the form of electromagnetic waves W, through accessory antenna 24. Receiver 94 converts the electromagnetic waves into encoded command signals which are fed into command decoder 96. The encoded command signals are decoded by command decoder 96 and output by command output 98 to controllers 88A, 88B, 90, and 92. In operation, receiver 94 receives electromagnetic waves W and converts those waves into encoded command signals which are electrically transmitted to command decoder 96. The encoded command signals are decoded by command decoder 96 into control commands corresponding to the movements and functions of light 18, in accordance with the operator's commands input into remote control 28. Command decoder 96 directs corresponding control commands to command output 98 which feeds these control commands to the appropriate controller, which in turn responds by activating or deactivating the appropriate component.

Figure 5A:
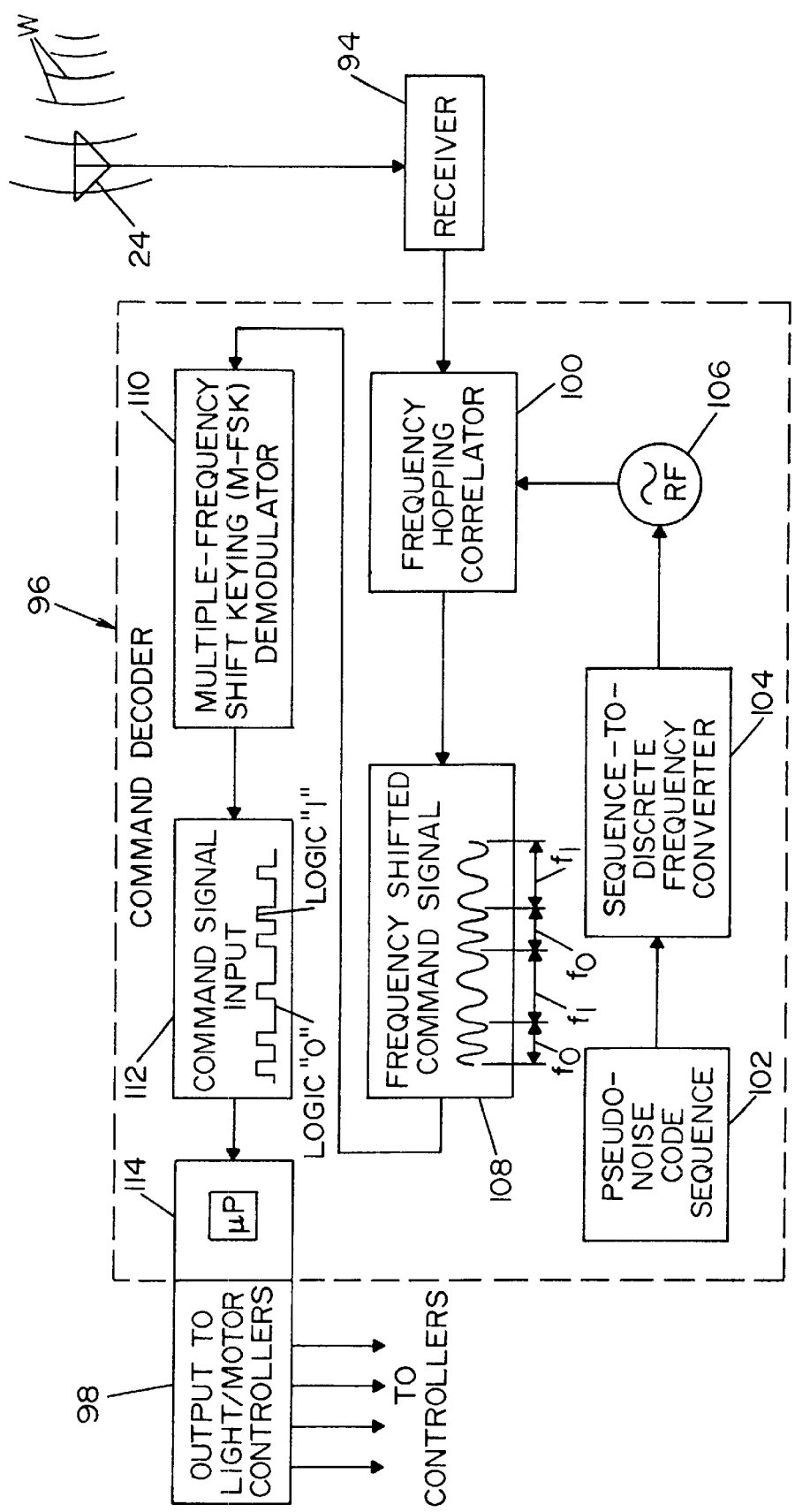
FIG. 5A is a schematic diagram of the command decoder of FIG. 5.

Command decoder 96 is illustrated in FIG. 5A. As discussed hereinbefore, receiver 94 receives electromagnetic waves W through antenna 24 and converts those waves into encoded command signals which are electrically transmitted to command decoder 96. Command decoder 96 decodes the encoded command signals and outputs corresponding control commands to command output 98. The encoded command signals are received from receiver 94 by frequency hopping correlator 100. To decode the encoded command signal, correlator 100 converts the signal into a frequency shifted command signal 108 using a carrier wave that is cooperable with the carrier wave used to encode the command signal from remote control 28. The cooperable carrier wave is generated by wave generator 106 which utilizes a pseudo-noise code sequence 102 and a frequency converter 104 to generate the cooperable carrier wave. Code sequence 102 is identical to code sequence 62 of remote control 28. Code sequence 102 is fed into converter 104 and each element of the sequence is converted to or correlated with a discrete hopping frequency in the same manner utilized by remote control 28. The series of frequency signals output by frequency converter 104 are fed into wave generator 106 which outputs the cooperable carrier wave that is fed into frequency hopping correlator 100. Frequency shifted command signal 108 output by correlator 100 is fed into multiple-frequency shift keying demodulator 110 which converts the resulting analog, frequency-shifted command signal into binary command signal 112 which is fed into microprocessor 114. Command output 98 receives control commands from microprocessor 114 and directs those control commands to the controllers as discussed hereinbefore. It will be appreciated that the command decoder 96 may be utilized to decode control commands corresponding to any one or more of a variety of accessories that may be mounted or otherwise supported at the end of mast 14. Accordingly, microprocessor 114 may be programmable to output control commands corresponding to any functions or movements of these other accessories.

Figure 3A:
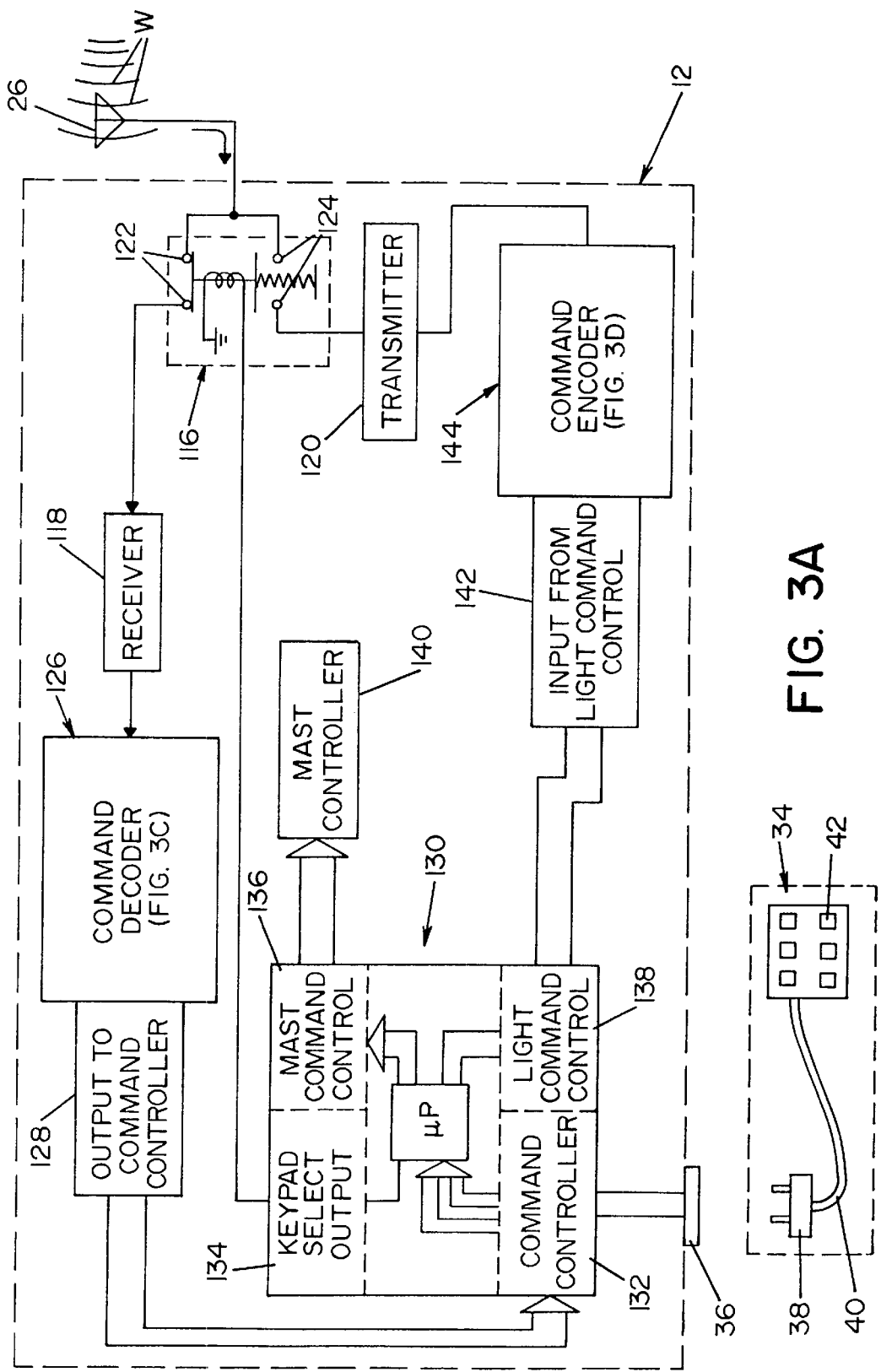
FIG. 3A is a schematic diagram of the portion of the control system in the base of the extendable mast arrangement of FIG. 1.
Figure 3B:
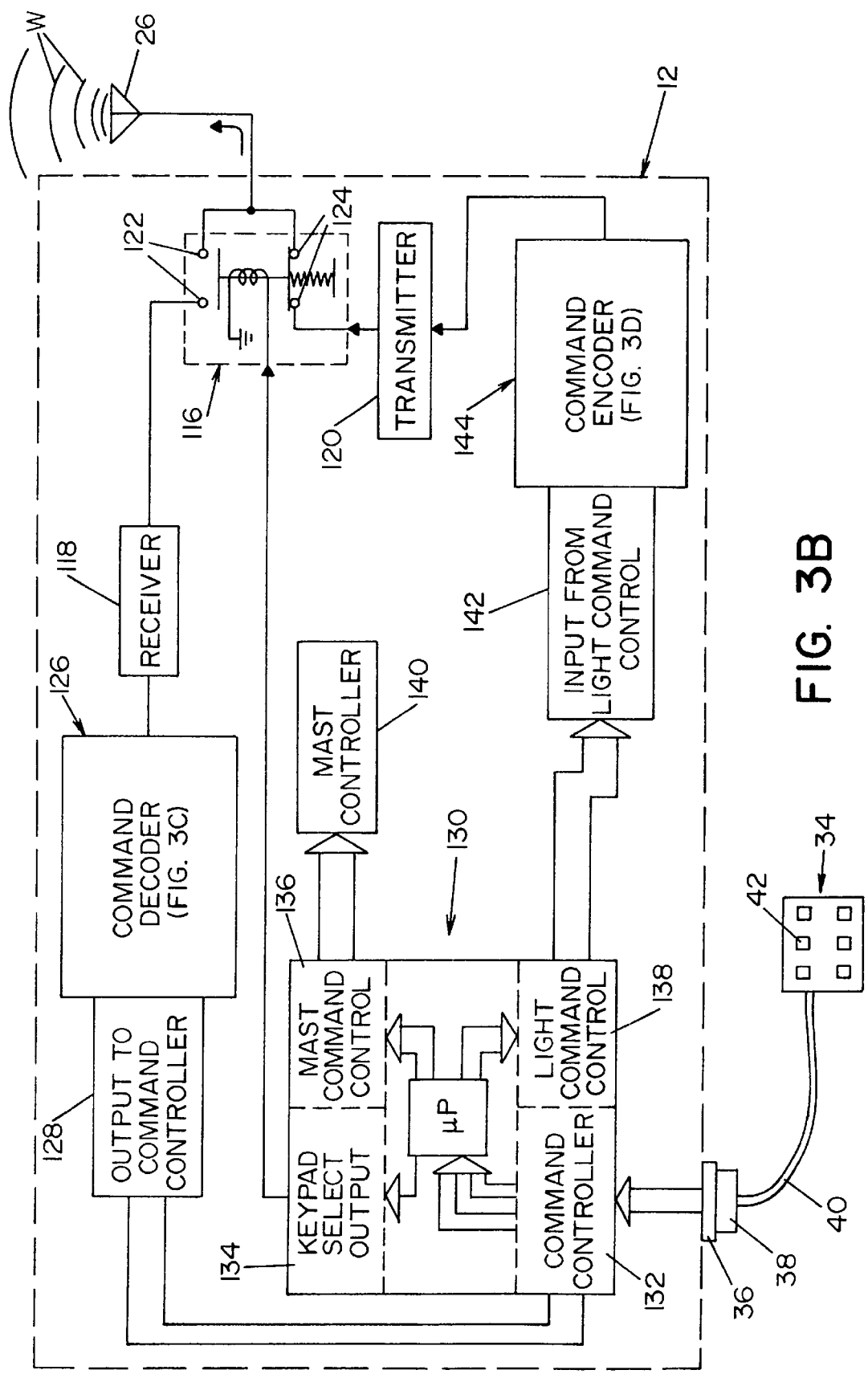
FIG. 3B is a schematic diagram of the portion of the control system in the base of the extendable mast arrangement of FIG. 2.

As shown in FIG. 1, remote control 28 outputs electromagnetic waves W that are received by accessory antenna 24 and base antenna 26. FIG. 3A is a schematic diagram illustrating a portion of the control system of mast arrangement 10 that is located in base 12. Extending from base 12 is base antenna 26 which is in selective electrical communication with either receiver 118 or transmitter 120 through switch 116. As will be discussed in further detail hereinafter, switch 116 is selectively positioned between a receiving station and a transmitting station in response to the absence or presence of wired control pad 34. In FIG. 3A, the plug 38 of control pad 34 is removed from receptacle 36 indicating that control pad 34 is not in use. Accordingly, switch 116 is shown in the receiving station wherein the switch is conductive across terminals 122. It will be appreciated, that receiver 118, command decoder 126 and command output controller 128 will operate in a manner substantially similar to that described for FIGS. 5 and 5A regarding the operation and responsiveness of light 18 to the commands from remote control 28. Accordingly, receiver 118 receives electromagnetic waves W from remote control 28 through base antenna 26 and across terminals 122 of switch 116. Receiver 118 converts the electromagnetic waves into encoded command signals that are electrically transmitted to command decoder 126. The encoded command signals are decoded by decoder 126 and control commands are electrically output to command output controller 128. Microprocessor 130 includes a plurality of input and output terminals, including command controller input terminal 132, keypad select output terminal 134, mast command control output 136, and light command control output 138. Control commands are fed into command controller input 132 of microprocessor 130 by either command output controller 128, as is shown in FIG. 3A, or by wired control pad 34 as is shown in FIG. 3B which will be discussed hereinafter. Microprocessor 130 processes the control commands input by controller 128 and outputs the corresponding control commands to mast controller 140 which is adapted to control the movements and functions of the mast as is discussed in Sturm '076 for example. Light command input control 142, command encoder 144, and transmitter 120 may not take an active roll in processing command signals when mast arrangement 10 is operating according to FIG. 1, as is shown in FIG. 3A.

As is shown in FIG. 2, an operator utilizes wired control pad 34 to input control commands directing the movement and functions of mast 14 and light 18. Control commands are communicated from wire control pad 34 to microprocessor 130 without the need for transmitting control signals as electromagnetic waves, such as has been discussed hereinbefore for remote control 28. Accordingly, receiver 118, command decoder 126, and command output controller 128 may not be utilized when mast arrangement 10 is operating as shown in FIG. 2. Accordingly, as microprocessor 130 recognizes the presence of wired control pad 34 at command controller input 132, keypad select output 134 activates switch 116 which moves from a receiving station to a transmitting station conductively connecting terminals 124 such that transmitter 120 and base antenna 26 are in electrical communication. Mast control commands from control pad 34 are processed by microprocessor 130 and communicated to mast controller 140 through mast command control output 136. Light control commands are also input through wired control pad 34, processed by microprocessor 130 and communicated to light command input control 142 through light command control output 138. The control commands are then fed into command encoder 134 which outputs an encoded command signal to transmitter 120. The transmitter converts the electrical, encoded command signals into electromagnetic waves that are broadcast by base antenna 26 as electromagnetic waves W.

Figure 3C:
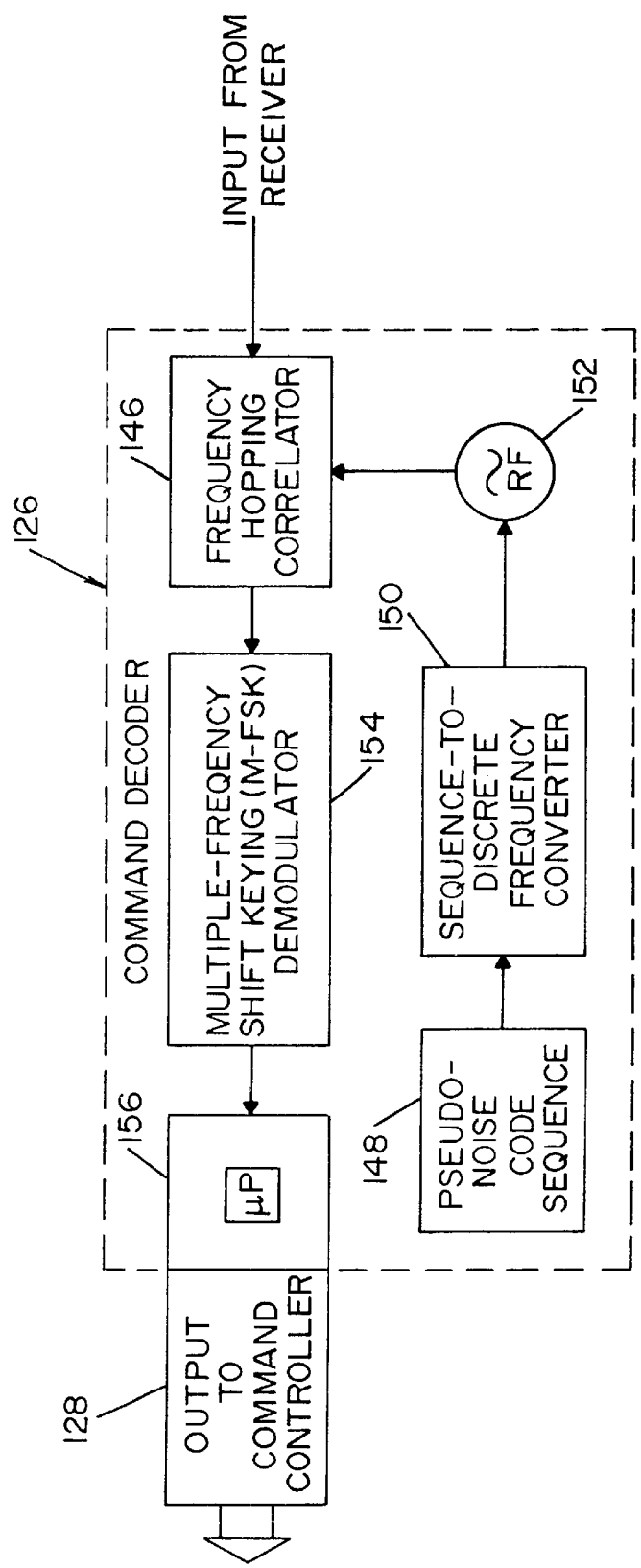
FIG. 3C is a schematic diagram of the command decoder of FIGS. 3A and 3B.

FIG. 3C illustrates command decoder 126. It will be appreciated that command decoder 126 is substantially similar in both construction and operation to command decoder 96 shown in FIG. 5A and described in detail hereinbefore. Output from receiver 118 is fed into a frequency hopping correlator 146. The correlator utilizes a carrier wave generated by wave generator 152 that is cooperable with the encoded command signal to decode the encoded command signal into a frequency-shifted command signal. Wave generator 152 utilizes a pseudo-noise code sequence 148 and a frequency convertor 150 to generate the cooperable carrier wave. Code sequence 148 is identical to code sequences 62 and 102, and frequency converter 150 utilizes code sequence 148 in the manner described for a converter 64 to output a series of frequency signals. Converter 150 then outputs a corresponding series of frequency signals which are fed into wave generator 150 to create the cooperable carrier wave. The frequency-shifted command signal output by frequency hopping correlator 146 is fed into multiple-frequency shift keying demodulator 154 which converts the frequency-shifted command signal into a binary command signal which is fed into microprocessor 156 for conversion into control commands which are then output by command output controller 128.

Figure 3D:
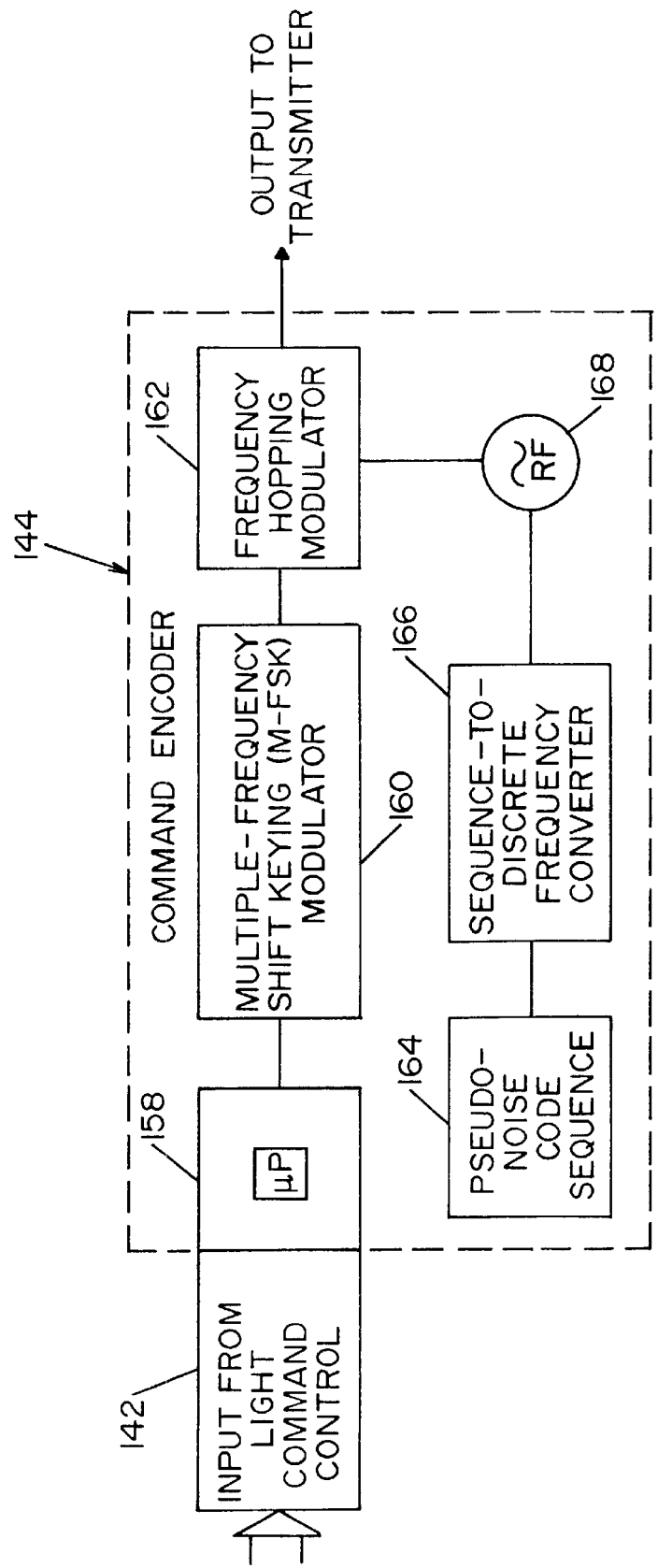
FIG. 3D is a schematic diagram of the command encoder of FIGS. 3A and 3B.

FIG. 3D is a schematic diagram of command encoder 144 which receives control commands from microprocessor 130 at light command input control 142 through light command control output 138. The control commands are communicated to microprocessor 158 and are converted into a binary command signal and fed into multiple-frequency shift keying modulator 160. A frequency-shifted command signal is output by modulator 160 and fed into frequency hopping modulator 162. Additionally, a carrier wave generated by wave generator 168 is also fed into modulator 162. The frequency-shifted command signal and the carrier wave are combined by modulator 162 to form an encoded control signal which is then output to a transmitter. A pseudo-noise code sequence 164 and a frequency converter 166 are utilized to generate a series of frequency signals fed into wave generator 168 to form a frequency-hopping carrier wave. Code sequence 164 is identical to code sequences 62, 102 and 148 which have been discussed hereinbefore. It will be appreciated that command encoder 144 is substantially similar in both form and operation to command encoder 46 in remote control 28 discussed in detail hereinbefore.

Figure 8:
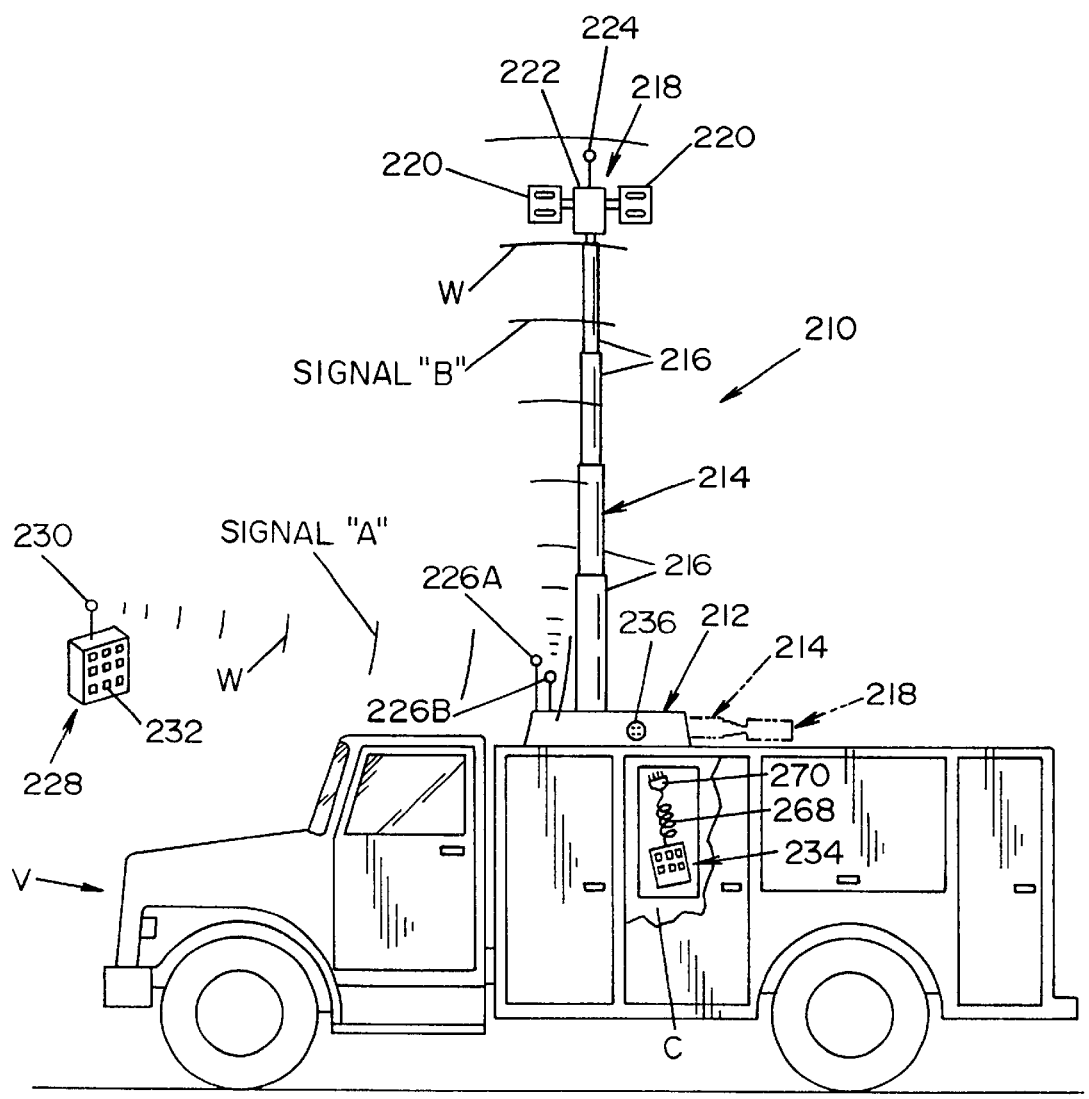
FIG. 8 is an illustration of an alternate embodiment of the extendable mast arrangement of FIG. 1.

An alternate embodiment of the invention is shown in FIG. 8 as mast arrangement 210 having a base 212, a mast 214, and a light 218. Mast 214 includes a plurality of telescopically extendable sections 216. One end of mast 214 is pivotally supported on base 212 and the opposite end extends upwardly therefrom and supports light 218. Mast arrangement 210 is supported on vehicle V, and further includes a wireless remote control 228 and a wired control pad 234 which is shown removed from operation and stored in compartment C of vehicle V. Light 218 includes light housings 220, a controller housing 222, and an accessory antenna 224. Remote control 228 includes a remote antenna 230 and a plurality of control keys 232. Base 212 includes two base antennas 226A and 226B, as well as a receptacle 236. Wired control pad 234 includes a wire 268 that terminates a plug 270 which is adapted to interengage with receptacle 236 when control pad 234 is in use. It will be appreciated that the structure and general operation of mast arrangement 210 are substantially similar to mast arrangement 10, with the embodiment of the control system of mast arrangement 210 as follows being the departure from mast arrangement 10 as it has been discussed hereinbefore.

Figure 9A:
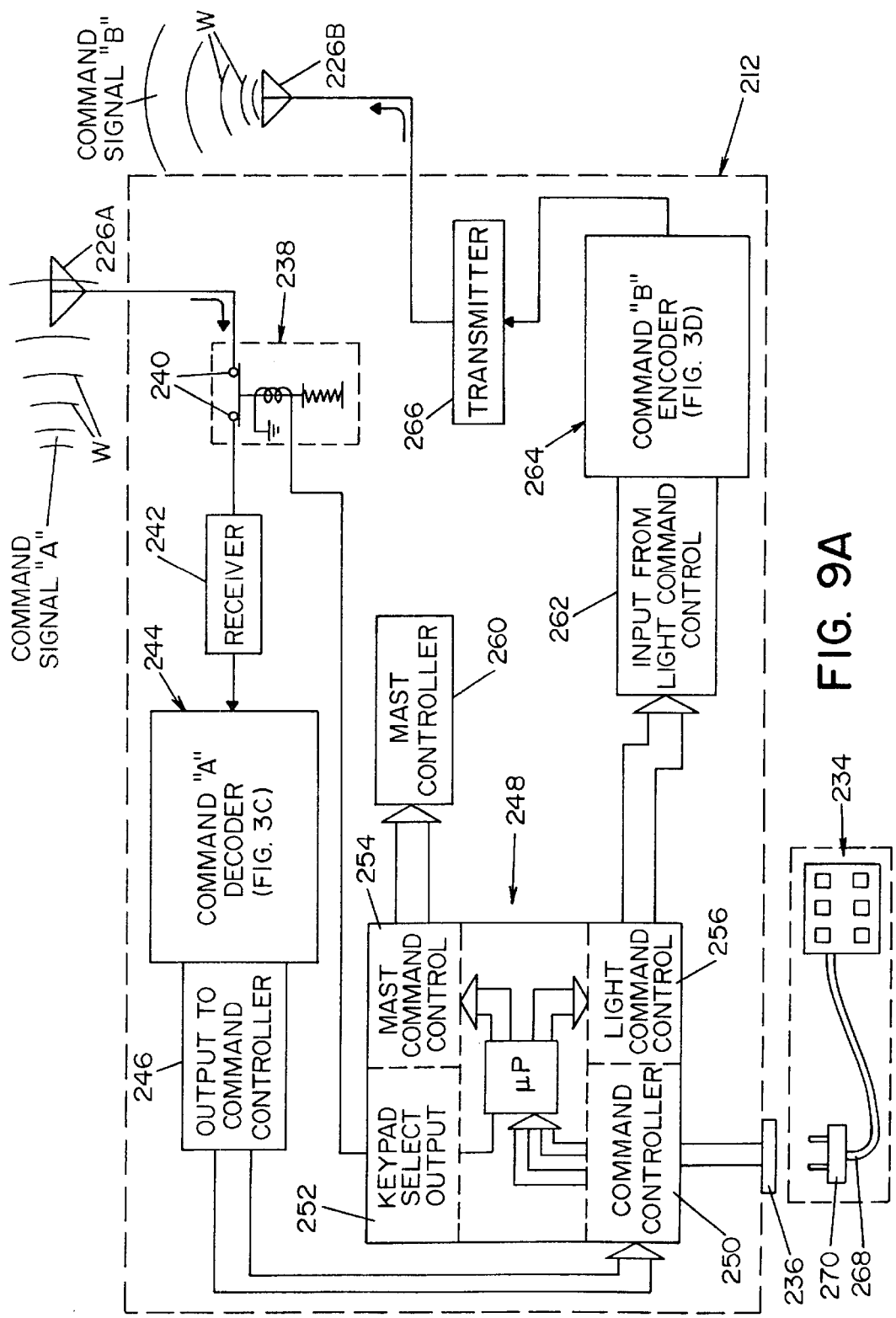
FIG. 9A is a schematic diagram of the portion of the control system in the base of the extendable mast in FIG. 8; and, FIG. 9B is the schematic diagram of FIG. 9A, shown with the wired control pad engaging the control system.

The operation of mast arrangement 210, as shown in FIG. 8, is represented in FIG. 9A which schematically illustrates the base portion of the control system of mast arrangement 210. Command signal A in the form of the electromagnetic waves W is received by receiver 242 through base antenna 226A and switch 238 which is shown closed such that the switch is conductive across terminals 240. Receiver 242 converts command signal "A" in the form of electromagnetic waves W into an encoded command signal that is electrically transmitted to command "A" decoder 244. FIG. 3C, as discussed hereinbefore, schematically represents command decoders 126 and 244. These decoders utilize a pseudo-noise code sequence 148 and a frequency converter 152 to generate a carrier wave that is combined with the incoming command signals to decode the encoded command signals into control commands suitable for use by other portions of the control system. It has been emphasized hereinbefore that the code sequence is identical in each of the encoders and decoders of mast arrangement 10. However, in mast arrangement 210, remote control 228 and decoder 244 will use one pseudo-noise code sequence to generate command signals denoted by "A". Command "B" encoder 264, which will be discussed hereinafter, and light 218 utilize a different code sequence in encoding and decoding command signals denoted by "B". Command "A" decoder 244 decodes the encoded command signal from receiver 242 and outputs corresponding control commands to command output controller 246. Microprocessor 248 includes a plurality of input and output terminals including command controller input terminal 250, keypad select output terminal 252, mast command control output terminal 254 and light command control output terminal 256. Command output controller 246 feeds control commands into microprocessor 248 through command controller input terminal 250. Microprocessor 248 processes the control commands and communicates mast control commands to mast controller 260 through mast command control output terminal 254, and communicates light control commands to light command input control 262 through light command control output terminal 256. Mast controller 260 is responsive to the mast control commands output by a microprocessor 248 and effects the corresponding movements of mast 214. Light command input control 262 feeds the light control commands into command "B" encoder 264. The light control commands are converted by encoder 264 into encoded command signals which are electrically communicated to transmitter 266 and broadcast thereby as command signal "B" in the form of electromagnetic waves W through base antenna 226B. It will be appreciated, as discussed hereinbefore, that encoder 264 and light 218 will use a different pseudo-noise code sequence from that used in remote control 228 and decoder 244. As such, command signals output by remote control 228 will be received by antenna 226A on base 212. The command signals will be processed by a microprocessor 248 and corresponding control commands will be electrically communicated to mast controller 260 and light control commands will be encoded and transmitted through electromagnetic waves to the accessory supported at the end of mast 214, such as light 218. In such an arrangement remote control 228 does not directly communicate with the mast accessory supported on mast 214.

Figure 9B:
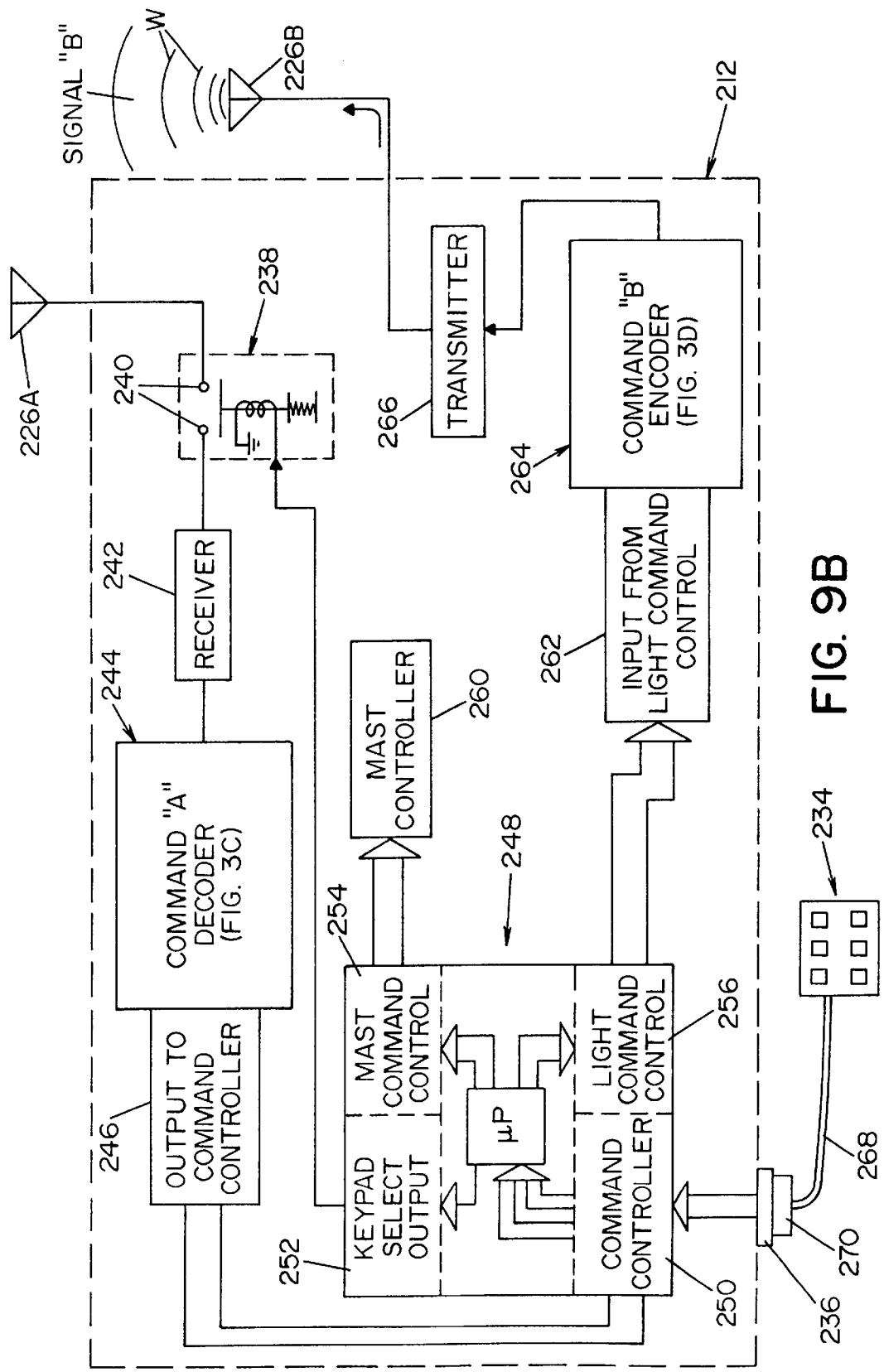

When wired control pad 234 is in use, as shown in FIG. 9B, command signals output by remote control 228 are not received by any part of mast arrangement 210 and therefore mast 214 and light 218 cannot be controlled by remote control 228. In FIG. 9B, the base portion of the control system of mast arrangement 210 is schematically illustrated showing plug 270 interengaging receptacle 236 such that wired control pad 234 is in electrical communication with command controller input terminal 250 of microprocessor 248 through wire 268. As previously indicated, when wired control pad 234 is in use wireless remote control 228 is isolated from the control system of mast arrangement 210 and is therefore not functional. Upon recognizing the presence of wired control pad 234, microprocessor 248 opens switch 238 through keypad select output terminal 252 isolating receiver 242, command decoder 244 and command output controller 246 from antenna 226A. Control commands are input by an operator through wired control pad 234. Microprocessor 248 processes the control commands and communicates mast control commands to mast controller 260 through mast command control output terminal 254, and communicates light control commands to light command input control 262 through light command control output terminal 256. The light control commands are fed into encoder 264 which outputs an encoded command signal that is electrically communicated to transmitter 266 and output as command signal "B" in the form of electromagnetic waves W through antenna 226B.

While considerable emphasis has been placed herein on the structures, electrical components, and logic of the embodiments disclosed, it will be appreciated that other embodiments of the invention can be made and that many changes can be made in the embodiments illustrated and described without departing from the principals of the invention. Accordingly, it is to be distinctly understood that the foregoing descriptive matter is to be interpreted merely as illustrative of the present invention and not as a limitation.

Having thus described the invention, it is so claimed:

1. An extendable mast arrangement for use on a mobile vehicle, said mast arrangement being comprised of:
   a base supported on the vehicle;
   an extendable mast having a first and a second end, said mast being supported on said base at said first end;
   a mast accessory supported on said mast; and,
   a control system for controlling said mast and said mast accessory, said control system including at least one transmitter to transmit electromagnetic signals, at least one receiver to receive said electromagnetic signals, at least one encoder and at least one decoder.

2. The extendable mast arrangement of claim 1, wherein said mast includes a plurality of telescopically extending sections, and said mast being pivotally connected to said base.

3. The extendable mast arrangement of claim 1, wherein each of said at least one encoder includes a spread spectrum modulator.

4. The extendable mast arrangement of claim 3, wherein each of said spread spectrum modulators utilizes frequency hopping modulation.

5. The extendable mast arrangement of claim 1, wherein said at least one encoder and said at least one decoder are cooperative, respectively encoding and decoding said electromagnetic signals.

6. The extendable mast arrangement of claim 5, wherein said at least one encoder includes a spread spectrum modulator, and said at least one decoder includes a spread spectrum demodulator.

7. The extendable mast arrangement of claim 1, wherein said at least one mast accessory includes at least one light source.

8. The extendable mast arrangement of claim 7, wherein said at least one light source includes at least one metal halide light.

9. The extendable mast arrangement of claim 1, wherein each of said at least one decoder includes a spread spectrum demodulator.

10. The extendable mast arrangement of claim 9, wherein each of said spread spectrum demodulators utilizes frequency hopping demodulation.

11. The extendable mast arrangement of claim 9, wherein each of said at least one encoder includes a spread spectrum modulator.

12. The extendable mast arrangement of claim 11, wherein each of said modulators utilizes frequency hopping modulation, and each of said demodulators utilizes frequency hopping demodulation.

13. The extendable mast arrangement of claim 11, wherein said modulators and said demodulators are cooperable, respectively encoding and decoding said electromagnetic signals.

14. The extendable mast arrangement of claim 1, wherein said at least one transmitter includes a first transmitter adapted to transmit electromagnetic signals, said at least one encoder includes a first encoder, and said first encoder is in electrical communication with said first transmitter.

15. The extendable mast arrangement of claim 14, wherein said first encoder includes a spread spectrum modulator.

16. The extendable mast arrangement of claim 15, wherein said modulator utilizes frequency hopping modulation.

17. The extendable mast arrangement of claim 1, wherein said at least one transmitter includes a first and a second transmitter adapted to transmit electromagnetic signals.

18. The extendable mast arrangement of claim 17, wherein said at least one encoder includes a first and a second encoder, said first encoder being in electrical communication with said first transmitter, and said second encoder being in electrical communication with said second transmitter.

19. The extendable mast arrangement of claim 18, wherein said first encoder and said second encoder each include a spread spectrum modulator.

20. The extendable mast arrangement of claim 19, wherein each of said modulators utilizes frequency hopping modulation.

21. The extendable mast arrangement of claim 1, wherein said at least one receiver includes a first and a second receiver adapted to receive electromagnetic signals.

22. The extendable mast arrangement of claim 21, wherein said at least one decoder includes a first and a second decoder, said first decoder being in electrical communication with said first receiver, and said second decoder being in electrical communication with said second receiver.

23. The extendable mast arrangement of claim 22, wherein said first decoder and said second decoder each include a spread spectrum demodulator.

24. The extendable mast arrangement of claim 23, wherein each of said demodulators utilizes frequency hopping demodulation.

25. The extendable mast arrangement of claim 21, wherein said at least one transmitter includes a first transmitter adapted to transmit electromagnetic signals, said at least one encoder includes a first encoder, and said first encoder is in electrical communication with said first transmitter.

26. The extendable mast arrangement of claim 25, wherein said first encoder includes a spread spectrum modulator.

27. The extendable mast arrangement of claim 26, wherein said modulator utilizes frequency hopping modulation.

28. The extendable mast arrangement of claim 21, wherein said at least one transmitter includes a first and a second transmitter adapted to transmit electromagnetic signals.

29. The extendable mast arrangement of claim 28, wherein said at least one encoder includes a first and a second encoder, said first encoder being in electrical communication with said first transmitter, and said second encoder being in electrical communication with said second transmitter.

30. The extendable mast arrangement of claim 29, wherein said first encoder and said second encoder each include a spread spectrum modulator.

31. The extendable mast arrangement of claim 30, wherein each of said modulators utilizes frequency hopping modulation.

32. The extendable mast arrangement of claim 21, wherein said at least one decoder includes a first and a second decoder, said first decoder being in electrical communication with said first receiver, and said second decoder being in electrical communication with said second receiver.

33. The extendable mast arrangement of claim 32, wherein said first decoder and said second decoder each include a spread spectrum demodulator.

34. The extendable mast arrangement of claim 33, wherein each of said demodulators utilizes frequency hopping demodulation.

35. The extendable mast arrangement of claim 32, wherein said at least one transmitter includes a first transmitter adapted to transmit electromagnetic signals, said at least one encoder includes a first encoder, and said first encoder is in electrical communication with said first transmitter.

36. The extendable mast arrangement of claim 35, wherein said first encoder and said first and second decoders are cooperable, respectively encoding and decoding said electromagnetic signals.

37. The extendable mast arrangement of claim 36, wherein said first encoder includes a spread spectrum modulator, and said first decoder and said second decoder each includes a spread spectrum demodulator.

38. The extendable mast arrangement of claim 37, wherein said modulator utilizes frequency hopping modulation, and said demodulators utilize frequency hopping demodulation.

39. The extendable mast arrangement of claim 32, wherein said at least one transmitter includes a first and a second transmitter adapted to transmit electromagnetic signals.

40. The extendable mast arrangement of claim 39, wherein said at least one encoder includes a first and a second encoder, said first encoder being in electrical communication with said first transmitter, and said second encoder being in electrical communication with said second transmitter.

41. The extendable mast arrangement of claim 40, wherein said first and second encoders, and said first and said second decoders are cooperable, respectively encoding and decoding said electromagnetic signals.

42. The extendable mast arrangement of claim 41, wherein said first and said second encoders each include a spread spectrum modulator, and a said first and said second decoders each include a spread spectrum demodulator.

43. The extendable mast arrangement of claim 42, wherein said modulators utilize frequency hopping modulation, and said demodulators utilize frequency hopping demodulation.

44. The extendable mast arrangement of claim 1, wherein said at least one transmitter includes a first transmitter, said at least one encoder includes a first encoder, said at least one receiver includes a first receiver, and said at least one decoder including a first decoder, said control system including an accessory control portion adjacent said mast accessory, a mast control portion adjacent said vehicle and a removable, wired, operator interface, said accessory control portion including an accessory controller, said first receiver and said first decoder, said first receiver being in electrical communication with said first decoder, and said first decoder being in electrical communication with said accessory controller, said mast control portion including a command controller, a mast controller, said first transmitter and said first encoder, said operator interface being in electrical communication with said command controller, said command controller being in electrical communication with said mast controller and said first encoder, and said first encoder being in electrical communication with said first transmitter.

45. The extendable mast arrangement of claim 44, wherein said first encoder, and said first decoder are cooperable to respectively encode and decode said electromagnetic signals.

46. The extendable mast arrangement of claim 45, wherein said first encoder includes a spread spectrum modulator, and said first decoder includes a spread spectrum demodulator.

47. The extendable mast arrangement of claim 46, wherein said modulator utilizes frequency hopping modulation, and said demodulator utilizes frequency hopping demodulation.

48. The extendable mast arrangement of claim 44, wherein said at least one transmitter includes a second transmitter, said at least one encoder includes a second encoder, said at least one receiver includes a second receiver, said at least one decoder includes a second decoder, and said control system includes a wireless remote interface, said wireless remote interface including a command interface, said second encoder, and said second transmitter, said command interface being in electrical communication with said second encoder, and said second encoder being in electrical communication with said second transmitter, and said mast control portion including said second receiver and said second decoder, said second receiver being in electrical communication with said second decoder, and said second decoder being in electrical communication with said command controller.

49. The extendable mast arrangement of claim 48, said mast control portion includes a switching arrangement in electrical communication with said first transmitter and said second receiver, said switching arrangement selectively activating one of said first transmitter and said second receiver.

50. The extendable mast arrangement of claim 48, wherein said first and said second encoder and said first and said second decoders are cooperable to respectively encode and decode said electromagnetic signals.

51. The extendable mast arrangement of claim 50, wherein said first encoder and said second encoder each includes a spread spectrum modulator, and said first decoder and said second decoder each includes a spread spectrum demodulator.

52. The extendable mast arrangement of claim 51, wherein said modulators utilize frequency hopping modulation, and said demodulator utilize frequency hopping demodulation.

53. The extendable mast arrangement of claim 1, wherein said control system includes a mast control portion adjacent the vehicle, an accessory control portion adjacent said accessory, and a wireless, remote interface.

54. The extendable mast arrangement of claim 53, wherein said at least one transmitter includes a first transmitter, and said at least one encoder includes a first encoder.

55. The extendable mast arrangement of claim 54, wherein said remote interface includes said first encoder and a command interface, said command interface being in electrical communication with said first encoder, and said first encoder being in electrical communication with said transmitter.

56. The extendable mast arrangement of claim 55, wherein said command interface includes a plurality of command keys.

57. The extendable mast arrangement of claim 55, wherein said first encoder includes a spread spectrum modulator.

58. The extendable mast arrangement of claim 57, wherein said modulator utilizes frequency hopping modulation.

59. The extendable mast arrangement of claim 53, wherein said at least one receiver includes a first receiver, and said at least decoder includes a first decoder.

60. The extendable mast arrangement of claim 59, wherein said accessory control portion of said control system includes said first receiver, said first decoder and an accessory controller, said first receiver being in electrical communication with said first decoder, and said first decoder being in electrical communication with said accessory controller.

61. The extendable mast arrangement of claim 60, wherein said first decoder includes a spread spectrum demodulator.

62. The extendable mast arrangement of claim 61, wherein said demodulator utilizes frequency hopping demodulation.

63. The extendable mast arrangement of claim 59, wherein said mast control portion of said control system includes said first receiver, said first decoder, and a mast controller, said first receiver being in electrical communication with said first decoder, and said first decoder being in electrical communication with said mast controller.

64. The extendable mast arrangement of claim 63, wherein said at least one receiver includes a second receiver, and said at least one decoder includes a second decoder.

65. The extendable mast arrangement of claim 63, wherein said first decoder includes a spread spectrum demodulator.

66. The extendable mast arrangement of claim 65, wherein said demodulator utilizes frequency hopping demodulation.

67. An extendable mast arrangement for use on a mobile vehicle, said mast arrangement being comprised of:
a base supported on the vehicle;
an extendable mast having a first and a second end, said mast being supported on said base at said first end;
a mast accessory supported on said mast; and,
a control system for controlling said mast and said mast accessory, said control system including at least one transmitter to transmit electromagnetic signals, at least one receiver to receive said electromagnetic signals, at least one encoder and at least one decoder;

said control system includes a mast control portion adjacent the vehicle, an accessory control portion adjacent said accessory, and a wireless, remote interface;

said at least one receiver includes a first receiver, and said at least one decoder includes a first decoder;

said mast control portion of said control system includes said first receiver, said first decoder, and a mast controller, said first receiver being in electrical communication with said first decoder, and said first decoder being in electrical communication with said mast controller;

said at least one receiver includes a second receiver, and said at least one decoder includes a second decoder;

said accessory control portion of said control system includes said second receiver, said second decoder and an accessory controller, said second receiver being in electrical communication with said second decoder, and said second decoder being in electrical communication with said accessory controller.

68. The extendable mast arrangement of claim 67, wherein said first and said second decoders each include a spread spectrum demodulator.

69. The extendable mast arrangement of claim 68, wherein said demodulator utilize frequency hopping demodulation.

70. An extendable mast arrangement for use on a mobile vehicle, said mast arrangement being comprised of:

a base supported on the vehicle;

an extendable mast having a first and a second end, said mast being supported on said base at said first end;

at least one mast accessory supported on said mast; and, a control system for controlling said mast and said at least one mast accessory, said control system including at least one transmitter to transmit electromagnetic signals, at least one receiver to receive said electromagnetic signals, at least one encoder, and at least one decoder;

said at least one encoder being cooperable with said at least one decoder to respectively encode and decode said electromagnetic signals.

71. The extendable mast arrangement of claim 70, wherein each of said at least one encoder includes a spread spectrum modulator.

72. The extendable mast arrangement of claim 71, wherein each of said spread spectrum modulators utilizes frequency hopping modulation.

73. The extendable mast arrangement of claim 70, wherein each of said at least one decoder includes a spread spectrum demodulator.

74. The extendable mast arrangement of claim 73, wherein each of said spread spectrum demodulations utilizes frequency hopping demodulation.

75. The extendable mast arrangement of claim 73, wherein each of said at least one encoder includes a spread spectrum modulator.

76. The extendable mast arrangement of claim 75, wherein each of said modulators utilizes frequency hopping modulation, and each of said demodulator utilizes frequency hopping demodulation.

77. An extendable mast arrangement for use on a vehicle, said mast arrangement being comprised of:

a base supported on the vehicle;

an extendable mast having a first end and a second end, said mast being pivotally supported on said base at said first end, said mast including a plurality of telescopically extendable sections;

at least one mast accessory supported on said mast; and, a control system for controlling the movements and functions of said mast and said at least one accessory, said control system including an accessory control portion, a mast portion and a first control interface;

said first control interface including a command interface, a first encoder and a first transmitter for transmitting electromagnetic signals, said command interface being in electrical communication with said first encoder, and said first encoder being in electrical communication with said first transmitter;

said accessory control portion including an accessory controller, a first decoder and a first receiver for receiving said electromagnetic signals, said first receiver being in electrical communication with said first decoder, and said first decoder being in electrical communication with said accessory controller.

78. The extendable mast arrangement of claim 77, wherein said command interface includes a plurality of command keys.

79. The extendable mast arrangement of claim 77, wherein said at least one mast accessory includes a light arrangement.

80. The extendable mast arrangement of claim 79, wherein said light arrangement includes at least one metalhalide light source.

81. The extendable mast arrangement of claim 79, wherein said light arrangement includes a housing, said housing having an opening therethrough defining an axis, said axis extending generally parallel with said mast, and said light arrangement being pivotable about said axis.

82. The extendable mast arrangement of claim 79, wherein said light arrangement includes a housing, said housing having an opening therethrough defining an axis, said axis extending transverse with said mast, and said light arrangement being pivotable about said axis.

83. The extendable mast arrangement of claim 77, wherein said first encoder includes a spread spectrum modulator, and said first decoder includes a spread spectrum demodulator.

84. The extendable mast arrangement of claim 83, wherein said modulator utilizes frequency hopping modulation, and said demodulator utilizes frequency hopping modulation.

85. The extendable mast arrangement of claim 83, wherein said modulator and said demodulator are cooperable, respectively encoding and decoding said electromagnetic signals.

86. The extendable mast arrangement of claim 77, wherein said control system includes a command controller, and said mast control portion includes a mast controller, a second receiver and a second decoder, said second receiver being in electrical communication with said second decoder, and said second decoder being in electrical communication with said command controller, and said command controller being in electrical communication with said mast controller.

87. The extendable mast arrangement of claim 86, wherein said first encoder includes a spread spectrum modulator, and said first and said second decoders each include a spread spectrum demodulator.

88. The extendable mast arrangement of claim 87, wherein said modulator utilizes frequency hopping modulation, and said demodulator utilize frequency hopping demodulation.

89. The extendable mast arrangement of claim 88, wherein said modulator and said demodulator are cooperable, respectively encoding and decoding said electromagnetic signals.

90. The extendable mast arrangement of claim 77, wherein control system includes a command controller, and said mast control portion includes a mast controller, a second encoder and a second transmitter, said command controller being in electrical communication with said mast controller and said second encoder, and said second encoder being in electrical communication with said second transmitter.

91. The extendable mast arrangement of claim 90, wherein said control system is adapted to selectively energize and de-energize said second transmitter.

92. The extendable mast arrangement of claim 90, wherein said first encoder and said second encoder each include a spread spectrum modulator, and said first decoder includes a spread spectrum demodulator.

93. The extendable mast arrangement of claim 92, wherein said modulators utilize frequency hopping modulation, and said demodulator utilizes frequency hopping demodulation.

94. The extendable mast arrangement of claim 93, wherein said modulators and said demodulator are cooperable, respectively encoding and decoding said electromagnetic signals.

95. The extendable mast arrangement of claim 90, wherein said mast control portion includes a second receiver and a second decoder, said second receiver being in electrical communication with said second decoder, and said second decoder being in electrical communication with said command controller.

96. The extendable mast arrangement of claim 95, wherein said control system is adapted to selectively energize one of said second transmitter and said second receiver.

97. The extendable mast arrangement of claim 95, wherein said at least one mast accessory includes a light arrangement.

98. The extendable mast arrangement of claim 97, wherein said light arrangement includes at least one metal-halide light source.

99. The extendable mast arrangement of claim 97, wherein said light arrangement includes a housing, said housing having an opening therethrough defining an axis, said axis extending generally parallel with said mast, and said light arrangement being pivotable about said axis.

100. The extendable mast arrangement of claim 97, wherein said light arrangement includes a housing, said housing having an opening therethrough defining an axis, said axis extending transverse with said mast, and said light arrangement being pivotable about said axis.

101. The extendable mast arrangement of claim 95, wherein said first and said second encoders include a spread spectrum modulator, and said first and said second decoders include a spread spectrum demodulator.

102. The extendable mast arrangement of claim 101, wherein said modulators utilize frequency hopping modulation, and said demodulator utilize frequency hopping demodulation.

103. The extendable mast arrangement of claim 102, wherein said modulators and said demodulator are cooperable, respectively encoding and decoding said electromagnetic signals.

104. An extendable mast arrangement for use on a mobile vehicle, said mast arrangement comprising:

a base supported on the vehicle;

a mast pivotally mounted on said base, said mast having a plurality of telescopically extending sections, a first end adjacent said base and second end opposite said first end;

a mast accessory supported at said second end of said mast; and, a control system for controlling said mast and said mast accessory, said control system including a wireless remote control, and having a mast control portion adjacent said base, and an accessory control portion adjacent said mast accessory;

said remote control having a plurality of command keys for initiating corresponding command signals, a command signal encoder, and a first transmitter adapted to transmit electromagnetic signals, said command keys and said encoder being in electrical communication, said encoder and said first transmitter being in electrical communication, and said encoder being adapted to utilize a code sequence to encode a command signal from said command keys and communicate the encoded command signal to said first transmitter for transmission as an electromagnetic signal;

said mast control portion and said accessory control portion each including a receiver and a command decoder, each of said receivers being adapted to receive said electromagnetic signal from said first transmitter, said receiver and said decoder of said mast control portion being in electrical communication, said receiver and said decoder of said accessory control portion being in electrical communication, each of said decoders being in electrical communication with said control system, and each of said decoders being adapted to utilize a cooperable code sequence to decode said electromagnetic signal and communicate said decoded command signal to said control system.

* * * * *